(12) United States Patent
Cairns

(10) Patent No.: US 8,900,000 B2
(45) Date of Patent: Dec. 2, 2014

(54) ROBOTICALLY MATEABLE ROTARY JOINT ELECTRICAL CONNECTOR

(75) Inventor: James L. Cairns, Ormond Beach, FL (US)

(73) Assignee: Teledyne ODI, Inc., Daytona Beach, CA (US)

( * ) Notice: Subject to any disclaimer, the term of this patent is extended or adjusted under 35 U.S.C. 154(b) by 943 days.

(21) Appl. No.: 13/030,698

(22) Filed: Feb. 18, 2011

(65) Prior Publication Data

US 2011/0207340 A1 Aug. 25, 2011

Related U.S. Application Data

(60) Provisional application No. 61/306,389, filed on Feb. 19, 2010.

(51) Int. Cl.
| | |
|---|---|
| *H01R 13/44* | (2006.01) |
| *H01R 13/523* | (2006.01) |
| *H01R 35/04* | (2006.01) |
| *G02B 6/38* | (2006.01) |
| *G02B 6/36* | (2006.01) |

(52) U.S. Cl.
CPC ............ *H01R 13/523* (2013.01); *G02B 6/3817* (2013.01); *H01R 35/04* (2013.01); *G02B 6/3604* (2013.01)
USPC .............. 439/135; 439/13; 439/138; 439/271

(58) Field of Classification Search
CPC ............ H01R 13/447; H01R 13/5213; H01R 43/205; H05K 7/1053; H05K 7/1007
USPC ........................ 439/135, 669, 357, 358, 23–28
See application file for complete search history.

(56) References Cited

U.S. PATENT DOCUMENTS

| | | | |
|---|---|---|---|
| 3,278,885 A | | 10/1966 | Klinger |
| 3,333,044 A | * | 7/1967 | Toto .............................. 174/15.7 |
| 3,508,188 A | | 4/1970 | Buck |
| 3,643,207 A | | 2/1972 | Cairns |
| 3,680,036 A | * | 7/1972 | McCamis et al. ............. 439/201 |

(Continued)

FOREIGN PATENT DOCUMENTS

| | | |
|---|---|---|
| FR | 2859828 A1 | 3/2005 |
| GB | 892801 A | 3/1962 |

OTHER PUBLICATIONS

U.S. Appl. No. 12/943,301, filed Nov. 10, 2010.
U.S. Appl. No. 13/009,681, filed Jan. 19, 2011.

*Primary Examiner* — Amy Cohen Johnson
*Assistant Examiner* — Vladimir Imas
(74) *Attorney, Agent, or Firm* — Procopio Cory Hargreaves & Savitch LLP

(57) ABSTRACT

A robotically mateable connector has a flying-lead plug unit and a receptacle unit adapted for releasable mating engagement with the plug unit. The plug unit includes a robotic manipulator grip assembly. A rear end shell which includes a cable attachment fitting holds a plug module having an outer surface carrying a plurality of axially spaced, annular contacts of gradually decreasing diameter towards a forward end of the module, and is rotatable relative to a plug front shell. The receptacle unit contains a receptacle module having a bore containing spaced annular contact seats of gradually increasing diameter designed for engagement with the plug contacts when the plug and receptacle units are fully mated. This provides a robotically actuated electrical connector that requires no rotational keying and relieves cable torque.

27 Claims, 17 Drawing Sheets

(56) References Cited

U.S. PATENT DOCUMENTS

| | | | |
|---|---|---|---|
| 3,729,699 A | 4/1973 | Briggs et al. | |
| 3,963,297 A * | 6/1976 | Panek et al. | 439/204 |
| 4,373,767 A | 2/1983 | Cairns | |
| 4,390,229 A * | 6/1983 | Chevalier | 439/201 |
| 4,420,199 A * | 12/1983 | Vis et al. | 439/13 |
| 4,588,243 A * | 5/1986 | Ramsey et al. | 439/374 |
| 4,606,603 A | 8/1986 | Cairns | |
| 4,704,775 A * | 11/1987 | Cross | 29/33 M |
| 4,711,507 A * | 12/1987 | Noorily | 439/292 |
| 4,905,938 A * | 3/1990 | Braccio et al. | 244/101 |
| 4,909,751 A | 3/1990 | Marolda, Jr. | |
| 4,917,619 A * | 4/1990 | Nishiwaki | 439/191 |
| 4,948,377 A | 8/1990 | Cairns | |
| 5,002,500 A * | 3/1991 | Zuccaro et al. | 439/348 |
| 5,171,158 A | 12/1992 | Cairns | |
| 5,267,880 A | 12/1993 | Tamm | |
| 5,334,032 A | 8/1994 | Myers et al. | |
| 5,484,296 A | 1/1996 | Taylor | |
| 5,645,442 A | 7/1997 | Cairns | |
| 5,722,842 A | 3/1998 | Cairns | |
| 5,772,457 A | 6/1998 | Cairns | |
| 5,816,835 A * | 10/1998 | Meszaros | 439/205 |
| 5,899,765 A | 5/1999 | Niekrasz et al. | |
| 6,017,227 A | 1/2000 | Cairns et al. | |
| 6,123,561 A | 9/2000 | Turner et al. | |
| 6,315,461 B1 | 11/2001 | Cairns | |
| 6,332,787 B1 * | 12/2001 | Barlow et al. | 439/138 |
| 6,464,405 B2 * | 10/2002 | Cairns et al. | 385/56 |
| 6,499,673 B1 * | 12/2002 | Braun et al. | 239/263.1 |
| 6,533,594 B1 * | 3/2003 | Kurup | 439/197 |
| 6,716,063 B1 * | 4/2004 | Bryant et al. | 439/589 |
| 6,736,545 B2 * | 5/2004 | Cairns et al. | 385/56 |
| 6,902,414 B2 * | 6/2005 | Dopf et al. | 439/140 |
| 7,244,132 B1 * | 7/2007 | Cairns et al. | 439/191 |
| 7,364,448 B2 * | 4/2008 | Cairns et al. | 439/201 |
| 7,429,193 B2 | 9/2008 | Cairns et al. | |
| 7,462,054 B2 | 12/2008 | Cairns et al. | |
| 7,478,775 B2 * | 1/2009 | Hopper | 242/375.1 |
| 7,481,584 B2 * | 1/2009 | Cairns | 385/60 |
| 7,665,996 B2 | 2/2010 | Jaeger | 439/13 |
| 7,748,444 B2 * | 7/2010 | Scott et al. | 166/65.1 |
| 7,749,008 B2 * | 7/2010 | Klassen et al. | 439/201 |
| 7,794,254 B2 | 9/2010 | Marklove et al. | |
| 7,837,518 B2 * | 11/2010 | Nicholson | 439/730 |
| 7,866,404 B2 * | 1/2011 | Rodney | 166/380 |
| 7,959,454 B2 * | 6/2011 | Ramasubramanian et al. | 439/201 |
| 8,025,506 B2 * | 9/2011 | Cairns | 439/24 |
| 8,292,645 B2 * | 10/2012 | Cairns | 439/271 |
| 2003/0007738 A1 * | 1/2003 | Cairns et al. | 385/56 |
| 2005/0104374 A1 * | 5/2005 | Steur | 285/247 |
| 2006/0246760 A1 | 11/2006 | Ogle et al. | |
| 2007/0005002 A1 * | 1/2007 | Millman et al. | 604/30 |
| 2008/0003868 A1 * | 1/2008 | Cairns | 439/552 |
| 2009/0080836 A1 * | 3/2009 | Cairns et al. | 385/56 |

* cited by examiner

ROBOTICALLY MATEABLE ROTARY JOINT ELECTRICAL CONNECTOR

RELATED APPLICATION

The present application claims the benefit of U.S. provisional pat. App. Ser. No. 61/306,389, filed Feb. 19, 2010, the contents of which are incorporated herein by reference in their entirety.

BACKGROUND

1. Field of the Invention

The present invention relates generally to connectors which can be mated and unmated in very harsh environments, such as underwater, and is particularly concerned with a robotically mateable, rotary joint electrical connector usable in such environments.

2. Related Art

There are many known electrical rotary joint connectors which function in dry environments, but not many that are suitable for harsh or underwater environments. Harsh environment rotary joint connectors are currently in use only for limited applications, such as down-hole drill strings, but they are not intended for general use, or for mating while completely submerged in a hostile environment.

Modern underwater systems, particularly sea floor systems, are generally of modular architecture with individual modules added and removed in-situ, and these modules are typically electrically interconnected by various jumper cables which have underwater mateable and demateable connectors on one or both ends. The connectors consist of two mating halves or units, specifically a plug unit and a receptacle unit. When these connector units are brought together in the mating process, the following relative alignment aspects must be controlled: axial offset (along the mating axis), axial tilt (of the mating axes), and rotation about the mating axis. The last of these, which requires rotational keying, is the most difficult to control.

All jumper cables have some resistance to torque, so that if one end is fixed, or substantially fixed due to great length, it is often very difficult to rotationally orient the free end into mating position, particularly if using the robotic manipulator of robot or robotic vehicle, such as an underwater vehicle or remotely operated vehicle (ROV). The problem is increased for very short jumper cables which cannot support much twist. Even in conditions where there is little cable torque, the problem of finding the mating key/key slot position increases the difficulty of connecting the jumpers. It would therefore be advantageous to provide a system where no keying of the mating connector portions or units is required, and which avoids the problem of twisting of the jumper cable when the connector on the cable's free end is rotated, as happens due to underwater vehicle maneuvering.

Most current underwater connectors designed for mating while completely submerged need to have the plug and receptacle parts keyed into rotational alignment for mating. Many of the connectors used for the oil and gas industry's subsea operations are connected and disconnected remotely, either by being mounted to large, opposed plates (stab plates) that come together during the mating process to join arrays of connectors, hydraulic couplers, and the like, or by robotic manipulators such as manipulators of remotely operated vehicles (ROV's). Mating remotely is made more difficult and expensive by the requirement to control the rotational alignment of the individual components to be mated.

In the early 1980's two-contact fluid-filled electrical connectors that required no rotational alignment were made commercially available. One example of such a connector is described in U.S. Pat. No. 4,606,603 of Cairns. These connectors did solve the rotational alignment problem, but one problem with such connectors was that two contacts were not enough to satisfy the needs of most operations. Another problem was that the receptacle's circular end-opening, which had to be pinched tightly closed before and after mating, had to be stretched several hundred percent to receive the plug's pin. If mated for a long time, particularly at low ocean temperatures, the opening did not close upon de-mating, and the connector subsequently failed.

In the late 1980's, multiple pin, fluid-filled connectors were once again introduced. They have all the required barriers, are robust, and exceptionally reliable. One such connector is the subject of U.S. Pat. No. 4,948,377 of Cairns. These connectors are manufactured by Teledyne ODI. They replaced the two-contact, single pin fluid-filled connectors described above as the high-reliability standard for the offshore industry. These connectors still have the rotational alignment problem, however, which somewhat limits their use, and requires special keying provisions for rotational alignment.

In the early 1990's a keyless, coaxial, oil-filled, wet-mateable connector was introduced that required no rotational alignment. This connector is described in U.S. Pat. No. 5,171,158 of Cairns (hereinafter '158 patent). It consisted of multiple ring-like contacts spaced along a constant diameter portion of the plug pin. The receptacle had corresponding ring-like contacts spaced along a rubber bore to receive the plug contacts. The overall layout of the contacts was very similar to the first type of connector described above. The main differences were that the connector of the '158 patent housed the receptacle contacts in a pressure-balanced, fluid-filled chamber; and, when mated, the individual pin/socket pairs were separated from each other by a single rubber seal. Unlike the coaxial connector of U.S. Pat. No. 4,606,603 (hereinafter '603 patent), the anterior sealed opening through which the plug's probe passed when entering the receptacle's chamber was occupied by a spring loaded piston before and after mating. That removed the necessity of the sealed opening to be pinched closed to a zero diameter as in the '603 patent.

The connector shown in the '158 patent was reasonably successful technically and quickly gained a dedicated customer base, but it was discontinued after being on the market for just a couple of years. It proved to be too expensive and difficult to manufacture. It also still had the problem of cross-connection during mating and de-mating as the plug's contacts wiped across receptacle contacts which were not their intended counterparts.

Underwater and other harsh environment connectors today typically require rotational alignment or keying for connection in a harsh environment, which makes robotic mating and demating difficult to accomplish, and also often results in torque or twisting of the flying lead jumper cables.

SUMMARY

Embodiments described herein provide a new harsh environment, robotically mateable electrical rotary joint connector.

In one embodiment, a submersible or harsh environment robotically mateable connector is provided which comprises a flying-lead plug unit and a fixed receptacle unit adapted for releasable mating engagement with the plug unit. The plug unit includes a robotic manipulator grip assembly for engagement by a robotic manipulator of a robot. In one embodiment, the grip assembly is configured for engagement by a manipulator of a remotely operated vehicle (ROV), but may be designed for gripping by other robotic devices in alternative embodiments. The grip assembly is associated with a two part tubular housing having a cable attachment fitting at a rear end. The housing has a rear end shell which includes the cable attachment fitting at the rear end and contains a plug module having one or more contacts and a front shell which is rotatable relative to the rear shell. The receptacle unit contains a receptacle module having a bore containing one or more contacts for mating engagement with the one or more contacts in the plug module. In one embodiment, the plug module has an outer surface carrying a plurality of spaced, annular contacts of gradually decreasing diameter towards a forward end of the module, and the receptacle module has a bore containing spaced annular contact seats of gradually increasing diameter designed for engagement with the plug contacts when the plug and receptacle units are fully mated. This provides a connector that can be mated and demated robotically without the need for rotational alignment.

The robotic manipulator grip may be a ring-shaped member, allowing the cable attachment fitting to be positioned co-axially with the mating axis of the connector unit. In one embodiment, the front shell of the plug unit includes a tubular slide which extends forward from the rear shell, and the plug contact module projects from the rear shell into the tubular slide. The grip assembly has a central hub secured to the slide.

The rear shell of the plug unit in one embodiment is free to rotate within the front shell via a slip-ring joint. The plug pin or contact module is held within the rear shell so as to rotate with the rear shell. Due to the design of the mating plug and receptacle contacts, the plug and receptacle modules can rotate relative to one another about the mating axis without degradation of the mating circuit's quality. In practice, the rear shell and plug module or pin rotate relative to the remainder of the connector to accommodate any torque or twist on the attached cable.

This connector includes mateable plug and receptacle contact modules that require no rotational keying. The arrangement includes a rotary joint to avoid or reduce the problem of jumper cable torque during mating, allowing the rear shell and plug pin to rotate relative to the front shell and receptacle unit, so that rotation of the connector on the cable's free end does not result in twisting of the jumper cable and the connector can be mated without imparting torque to the attached cable. Unlike other robotically mateable connectors, the cable exit in the connector is provided along the mating axis of the flying-lead plug.

Although a keyless electrical connector is described above, it may form part of a hybrid electro-optical connector in other embodiments.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Certain embodiments as disclosed herein provide for a multi-circuit electrical connector having plug and receptacle units that can be mated and de-mated robotically without need to rotationally align the units.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention.

Figure 1A:
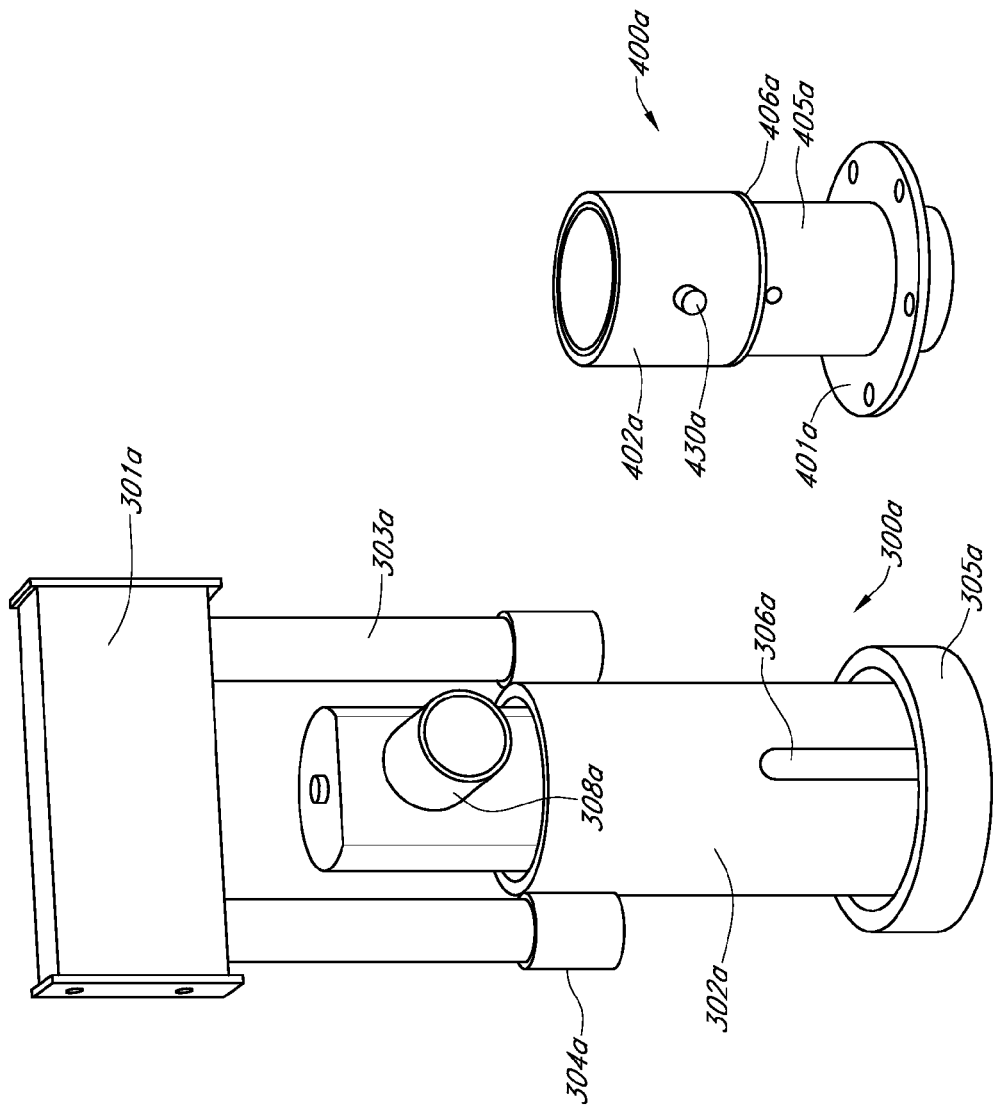
FIG. 1A is a perspective view of one type of prior art connector designed for underwater robotic mating and demating.
Figure 1B:
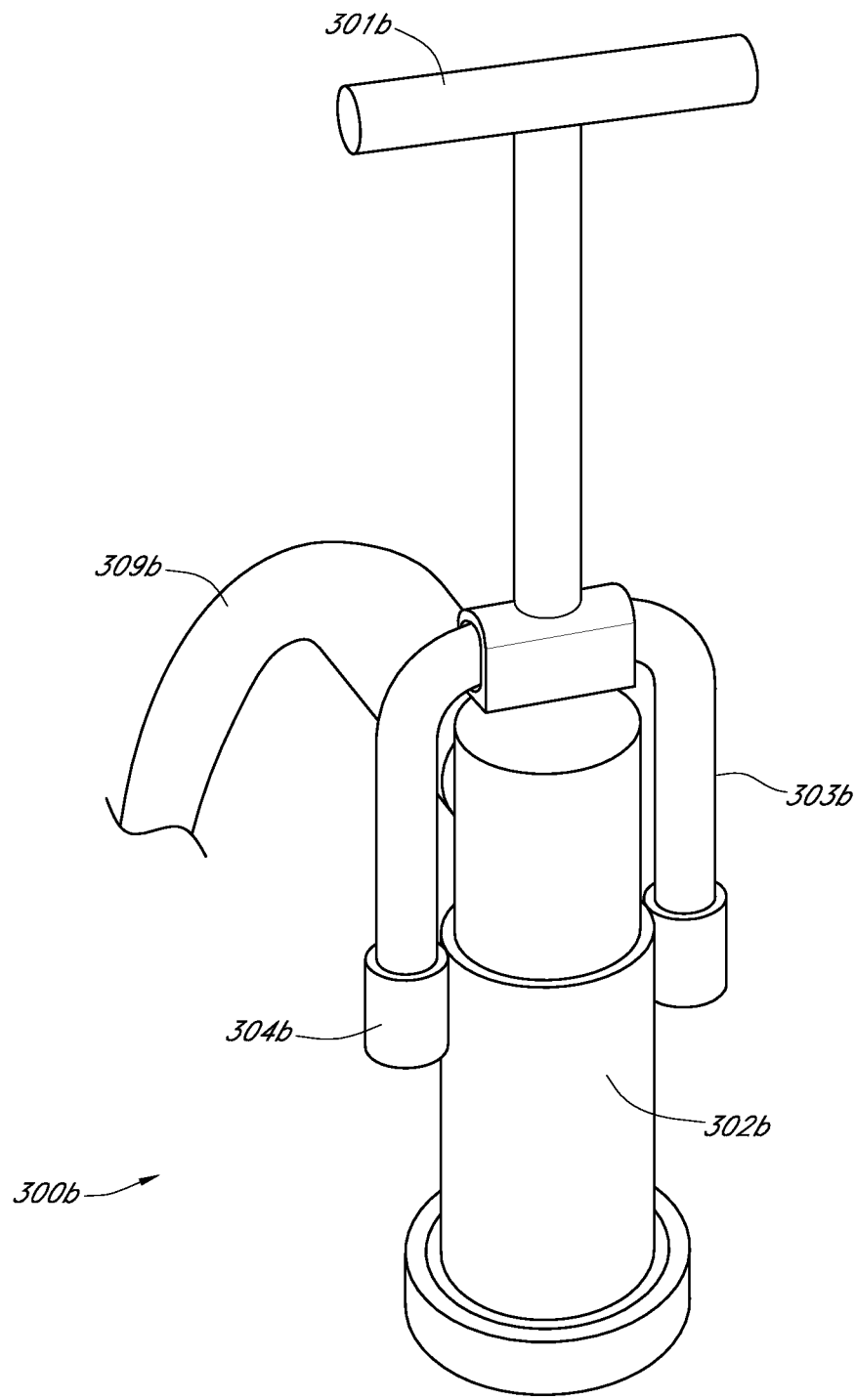
FIG. 1B is a perspective view of a second type of prior art, robotically mateable connector.

FIGS. 1A and 1B illustrate typical, existing connectors designed for underwater robotic mating and demating, for example by manned or ROV submersibles. The connectors each comprise one part intended to be sealably flange-mounted to an enclosed volume, such as a junction box, and another part attached to the free end of a cable, usually called a "flying lead". For ease of discussion, the two flying-lead attachment portions shown in FIGS. 1A and 1B are referred to as plug units, although in most existing products they could actually be either a plug unit or a receptacle unit.

Flying lead connector parts 300a (FIG. 1A) and 300b (FIG. 1B) have manipulator grip handles 301a, 301b which are designed for two different types of robotic manipulators which are described as follows. The flat portion of grip handle 301a is intended for use by a manipulator whose grip consists of opposed jaws that come together like those of a vise to clamp the flat grip handle. The cylindrical "T" portion of T-shaped grip handle 301b can be used either by a vise-like grip, or by a manipulator whose grip comprises opposed pairs of articulated hooks.

Both of the manipulator grip handles 301a and 301b attach to respective slides 302a, 302b, which are mechanically identical, by way of flexible rods 303a, 303b mounted in sockets 304a, 304b forming integral parts of the slides. Except for grip handles 301a, 301b and flexible rods 303a, 303b, the mechanical features of the connectors 300a and 300b are identical. The connector portions to which the grip handles are connected, in this case the flying lead plug units, are made up of the portion which electrically connects the circuits (not shown), a slide portion such as 302a, a bumper 305a, a key slot 306a (not shown on 300b), and opposed latch fingers (not illustrated).

Each of the connector plug units 300a, 300b has cable attachment means such as 308a (FIG. 1A) to which a jumper cable such as 309b (FIG. 1B) is sealably connected. In the case of flying lead plug units 300a, 300b, the cable attachment is for an oil-filled hose that serves as a flexible, protective conduit for electrical wires, but a similar suitable attachment would serve for any sort of harsh environment cable. It should be noted that cable attachment means 308a is oriented such that the attached cable, such as 309b, is orthogonal to the mating axis of the connectors. All existing electrical connectors which use grip handles for manipulator actuation have the cable exit orthogonal to the connector mating axis.

It should be noted that flexible rods 303a, 303b that support grip handles 301a, 301b, respectively, can bend back and forth in the plane that includes the cable exit, but cannot easily bend in the plane at right angles to the cable exit. Such bending would require stretching of one rod and compressing the other rod.

Plugs 300a, 300b mate to flange-mounted receptacles typified by 400a, which comprise a shell 405a with a shoulder 406a and mounting flange 401a intended to sealably affix the receptacle to an opening penetrating the wall of an underwater junction box or the like, a bumper 402a, and an alignment key 430a. When the connector units 300a, 400a are mated, flying lead plug unit 300a must be rotated such that key slot 306a finds key 430b, thus permitting full contact engagement. This maneuver can be hard to accomplish when using a robotic manipulator in an underwater environment.

FIGS. 2 to 15 illustrate one embodiment of a multi-circuit, rotary joint electrical connector 300, 400 that can be mated and demated in very harsh embodiments. In the following description, the connector is described as being robotically mated underwater, for example using an ROV, but it may also be adapted for robotically mating by other robotic devices in other harsh or hazardous environments such as outer space, nuclear plants, chemical plants, geothermal environments, and the like. The connector comprises a flying-lead plug unit 300 (see FIGS. 2, 4 and 6 to 12) designed for attachment to the free end of a cable via cable attachment fitting 308, and a receptacle unit 400 (see FIGS. 3, 5 and 6) which is designed to be sealably flange-mounted to a fixed unit such as a junction box. In alternative embodiments, the units may be reversed with the receptacle unit designed for attachment to a cable and the plug unit designed to be fixed to a housing or component such as a junction box housing or the like.

Figure 5:
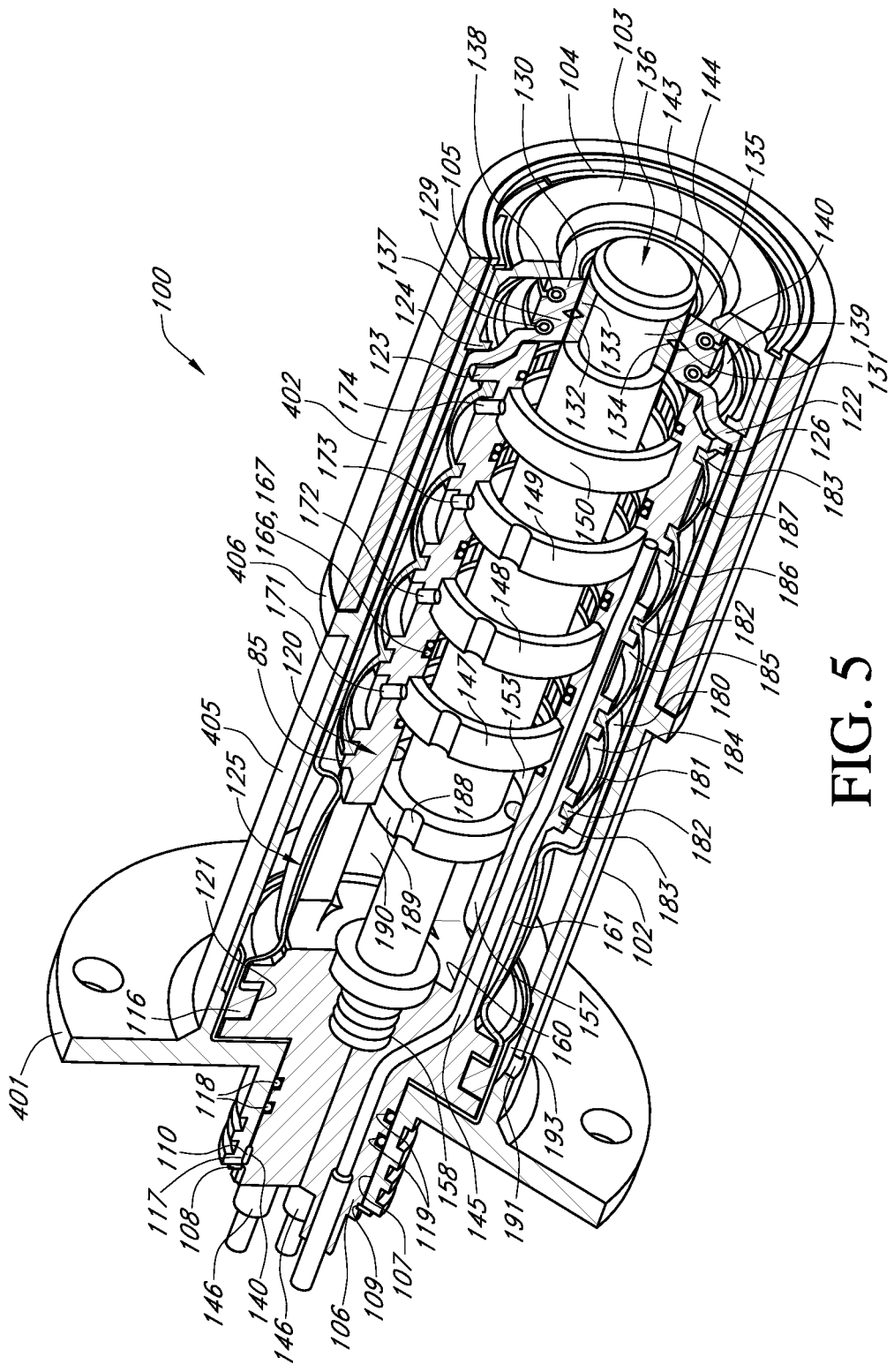
FIG. 5 is a 135 degree axial, partial cross-sectional view of the receptacle of the receptacle unit of FIG. 3.
Figure 6:
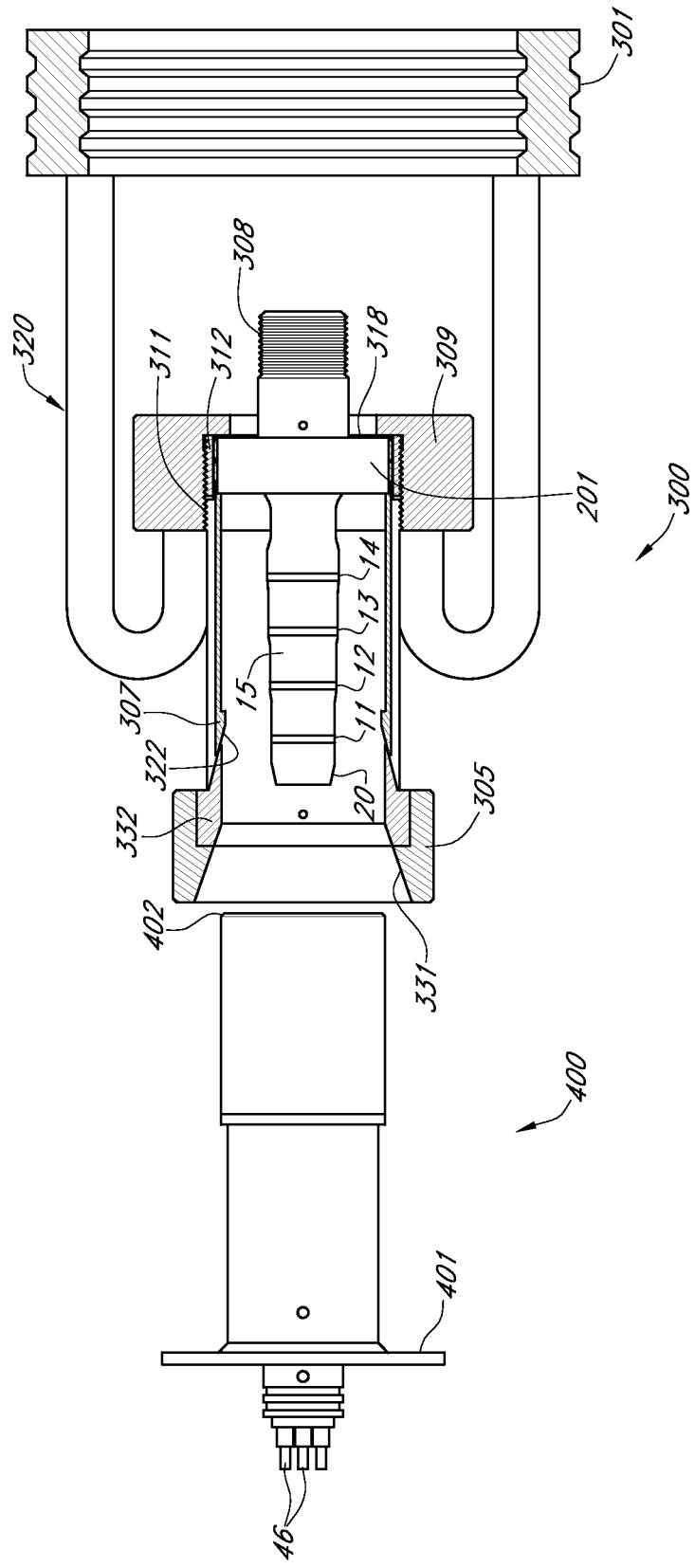
FIG. 6 is a side elevation view of the plug and receptacle units of FIGS. 2 to 4A and 5 poised in position prior to being mated, with the plug unit shown in cross-section.
Figure 7:
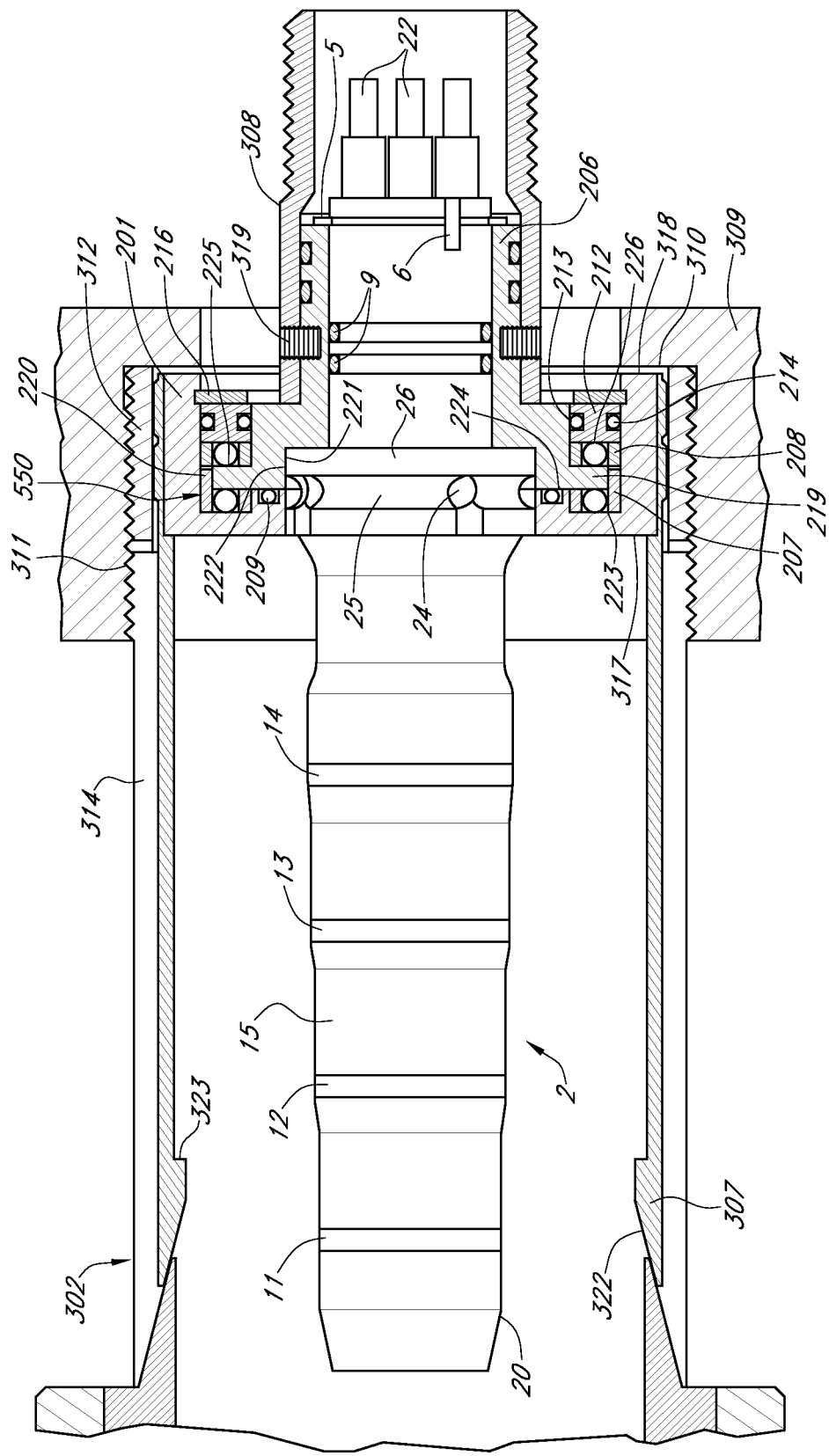
FIG. 7 is an enlarged, partial half-sectional view of the plug unit illustrating the rotating joint which allows free rotation of an attached cable.
Figure 9:
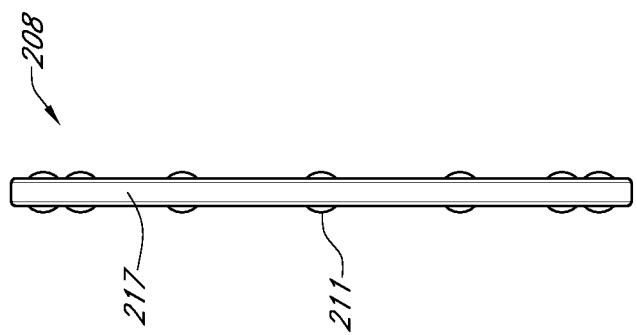
FIG. 9 is a side elevation view of the bearing assembly of FIG. 8.
Figure 10:
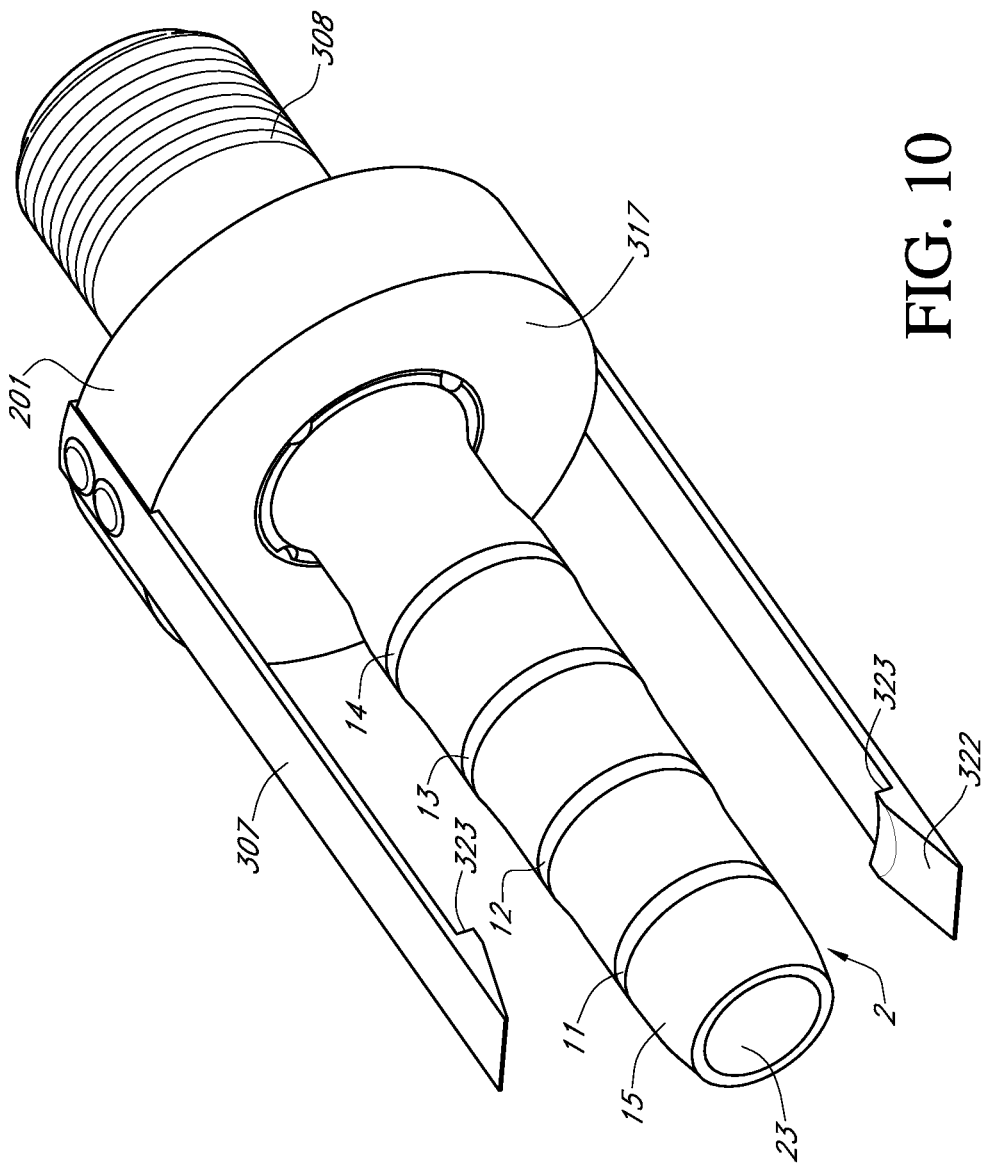
FIG. 10 is a perspective view of the plug pin or plug module and the relatively rotatable plug front and rear shells, omitting the grip assembly and slide of FIGS. 2 and 7.

The plug and receptacle units 300, 400 contain multiple circuit plug and receptacle contact modules 2, 120, respectively, which are designed for keyless engagement. The receptacle contact module 120 is illustrated in detail in FIG. 5, while the plug contact module is seen in FIGS. 6, 7 and 10. The contact modules are designed so that no particular rotational alignment is required between the plug and receptacle units as they are mated in order to ensure that the plug and receptacle contacts are properly engaged on mating. Any keyless plug and receptacle contact modules may be used in this connector. In the illustrated embodiment, the connector is a keyless electrical connector similar to that described in co-pending patent application Ser. No. 12/943,301 filed on Nov. 10, 2010, which claims priority from provisional application No. 61/260,100 filed on Nov. 11, 2009, and the contents of which are incorporated herein by reference. The connector described herein is similar to that of patent application Ser. No. 12/943,301, referenced above, but with modifications to both the plug and receptacle units. The modifications to the receptacle unit are relatively minor and comprise modification of the outer shell to provide a mounting flange and the addition of an enlarged diameter end portion or bumper, as described in more detail below with reference to FIG. 3. The flying lead plug unit is modified to incorporate a grip ring for robotic orientation, a slide and a front end bumper secured to the slide, as well as a rotating joint structure, as described in more detail below with reference to FIGS. 2 and 6 to 12.

As in co-pending application Ser. No. 12/943,301 referenced above, the connector is a pin-and-socket connector in which the plug module 2 has a pin 15 of progressively stepped diameter with annular contacts staged in progressively larger diameters along a pin from tip to base, as illustrated in FIG. 7. The receptacle module 120 in turn has a bore of stepped diameter with respective annular contacts staged in progressively smaller diameters inward from the mating face along an internal bore, as illustrated in FIG. 5.

Figure 3:
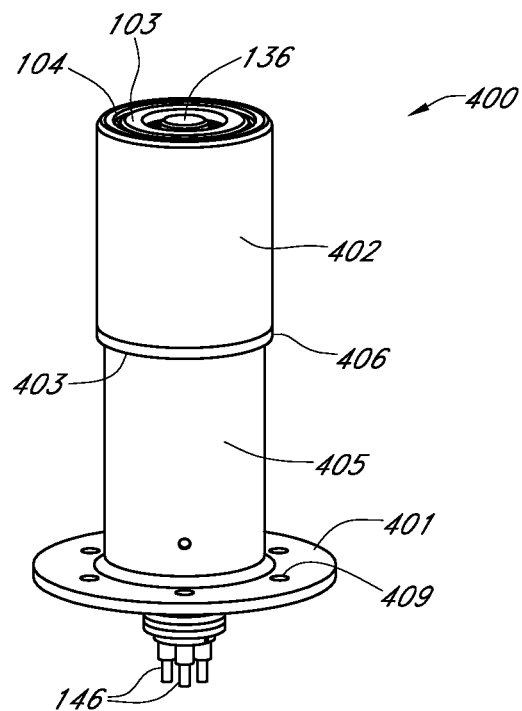
FIG. 3 is a front perspective view of a receptacle unit of the electrical connector which is designed for releasable mating engagement with the plug unit of FIG. 2.

The only difference between the receptacle unit 400 of this embodiment and the receptacle unit described in co-pending application Ser. No. 12/943,301 referenced above is the modified outer shell, which comprises rear shell 405 and front shell or bumper 402, while the receptacle contact module 120 enclosed in the receptacle unit is identical to the receptacle contact module described in the aforementioned application. All other parts of the receptacle unit are unchanged, and are also described in more detail below in connection with FIG. 5. As illustrated in FIG. 3, the receptacle shell is in two parts, comprising rear shell 405 which has a flange 401 at the rear end of the receptacle unit with holes 409 for use in mounting the flange to a structure or housing, such as a junction box, using suitable fastener devices, and front shell 402. Shell 405 also has a second flange 406 at its forward end. Bumper or forward shell 402 extends from flange 406 over the forward end of the receptacle contact module and backs up against flange 406 on rear shell 405. Flange 406 has a rear shoulder 403, the function of which is described in more detail below. Bumper 402 may be made of plastic material or the like and is secured to shell 405 in any suitable manner, for example via multiple screws, or the two shells may be formed integrally in alternative embodiments.

Figure 2:
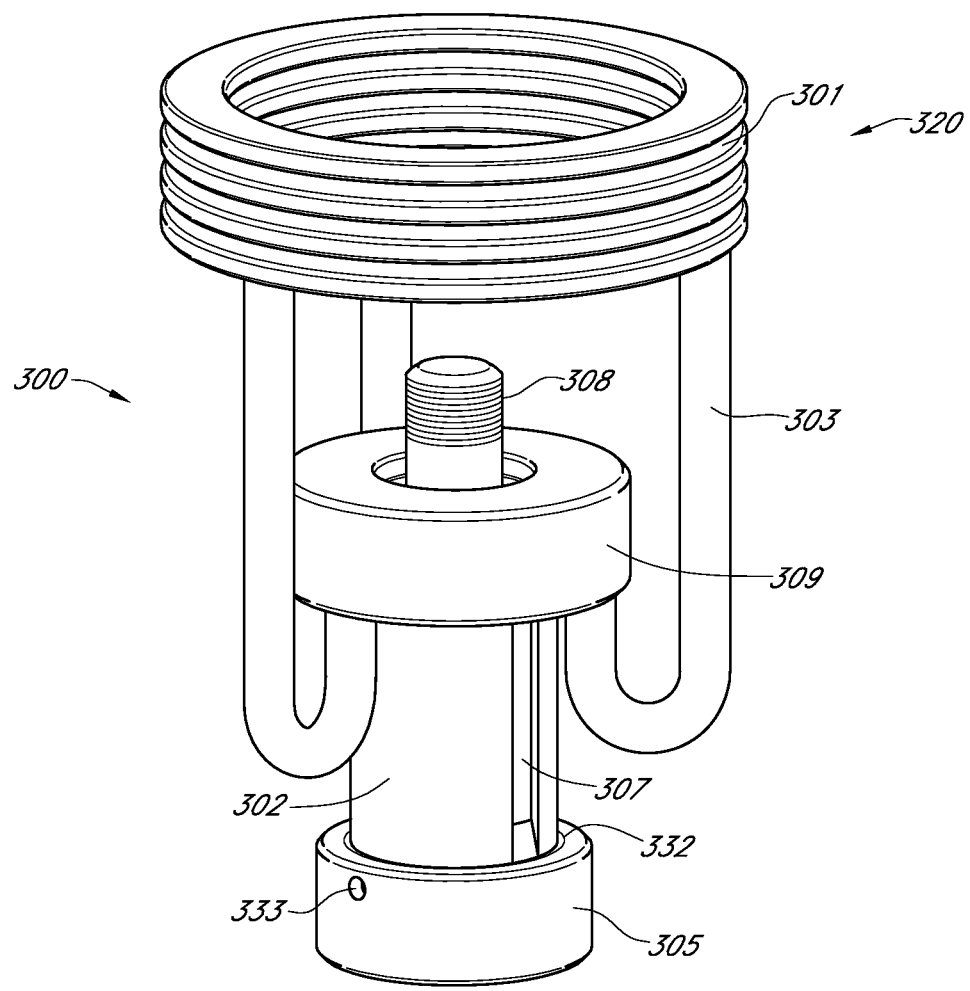
FIG. 2 is a front perspective view of a flying-lead connector unit or plug unit of a first embodiment of a robotically actuated electrical connector.

Flying-lead plug unit 300 is different in several respects from the plug unit described in co-pending application Ser. No. 12/943,301 referenced above. First, as illustrated in FIGS. 6 and 7, the plug shell comprises an outer housing having relatively rotatable front and rear shells, rather than a unitary or one piece plug shell. Second, the front shell includes multiple parts, comprising an inner portion or shell part 201 which is rotatably engaged with rear shell 206, a robotic manipulator grip assembly 320, a tubular slide 302, and a plug bumper 305 (see FIGS. 2 and 6). Grip assembly 320 is secured via hub 309 to one end of tubular slide 302, as best illustrated in FIG. 7. Internal threads 312 on hub 309 engage external threads 311 at the rear end of slide 302. A plug bumper 305 is affixed at the opposite, forward end of tubular slide 302, as illustrated in FIGS. 2 and 6. Plug bumper 305 has a conical entrance 331 (FIG. 6) for receiving the forward end of receptacle bumper 402 when the units are mated, and is fixed to a heavy walled portion 332 of slide 302 by multiple screws 333 (FIG. 2). Bumper 305 may also be made of plastic.

Plug contact module 2 is located inside tubular slide 302, as illustrated in FIG. 7, and is secured at its rear end to plug rear shell 206. Rear shell 206 is rotatably coupled to the inner portion or shell part 201 of the front shell via a rotary joint 550 which is illustrated in more detail in FIGS. 7, 8 and 9 and described in more detail below. The rotary joint is identical to the rotary joint described in co-pending patent application Ser. No. 13/009,681 filed on Jan. 19, 2011, which claims priority from provisional application No. 61/296,604 of the same applicant filed on Jan. 20, 2010, which is entitled Harsh Environment Rotary Joint Electrical Connector. A standard cable attachment fitting 308 is secured to the plug rear shell 206 via screws 319. Fitting 308 is coaxial with the central mating axis of the plug unit.

Plug inner portion or front shell part 201 is illustrated in detail in FIG. 10 prior to attachment of the tubular slide 302 and grip assembly 320. As illustrated in FIGS. 7 and 10, front shell part 201 has a front and face 317 and a rear end face 318, and a pair of diametrically opposed latch hinges 307 which extend forward from front shell part 201. Fingers 307 have ramps 322 at their forward ends, with a shoulder 323 at the rear end of each ramp.

Figure 11A:
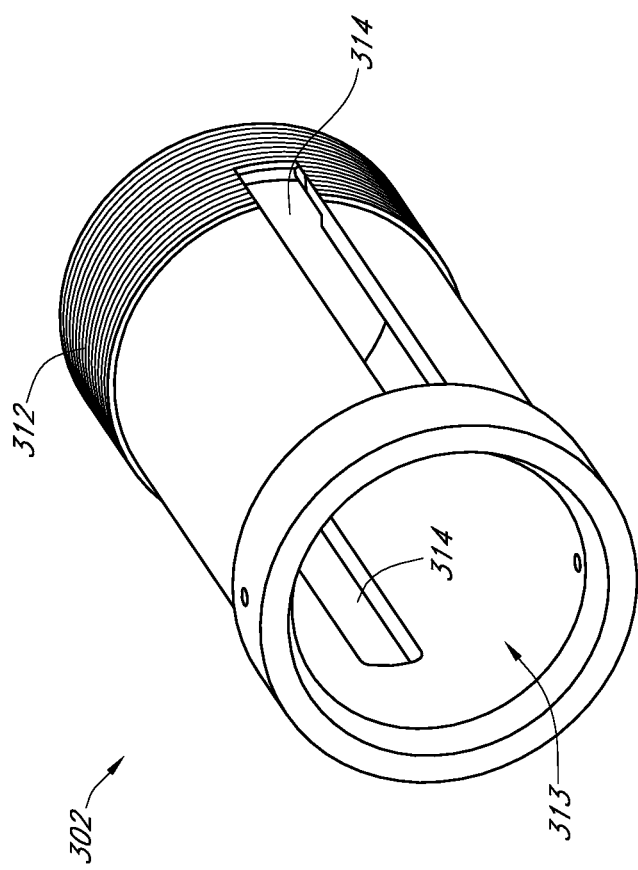
FIGS. 11A and 11B are anterior and posterior oblique views of the slide of the plug unit.
Figure 11B:
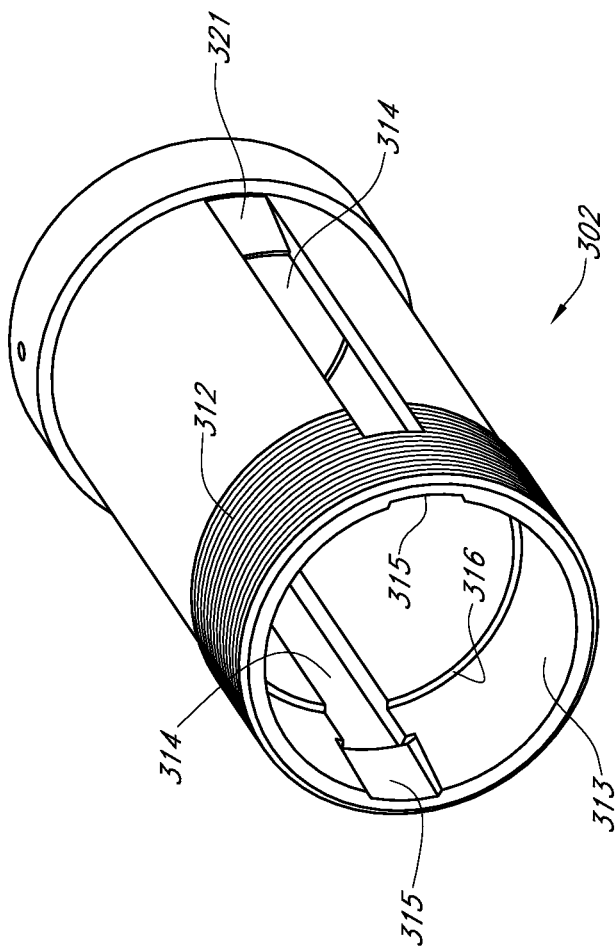

Tubular slide 302 is illustrated in detail in FIGS. 11A and 11B, and has an internal bore 313 which is a close sliding fit over the outer diameter of inner portion or front shell part 201, and a rear portion having outer threads 312 for attachment to grip assembly 320 as described above. Latch fingers 307 which project forward from shell part 201 extend into the slide 302 and are captured in corresponding slots 314 in the tubular slide 302, as illustrated in FIGS. 2 and 7, so that the relative rotational orientation of the slide 302 is substantially fixed relative to the inner portion or shell part 201. As illustrated in FIG. 11B, slots 314 of slide 302 terminate at their anterior ends in ramps 321. During assembly, cutouts 315 at the rear end of slide 302 allow the slide to be installed from the anterior end of plug 300 when the plug is in the partially assembled condition of FIG. 10. As illustrated in FIG. 11B, cutouts 315 allow the slide 302 to pass over latch fingers 307 and move towards the posterior end of plug 300 until shoulder 316 butts against face 317 of the plug front or outer shell 201 (see FIG. 7). At that point, ramps 322 at the ends of latch fingers 307 engage the ramps 321 at the ends of the slots 314, and the slide 302 is constrained from further rearward movement. When the slide is in the rearmost position relative to the plug shell, grip assembly 320 is engaged with the external threads 312 at the rear end of the slide, as described in more detail below in connection with FIG. 4A.

Figure 4A:
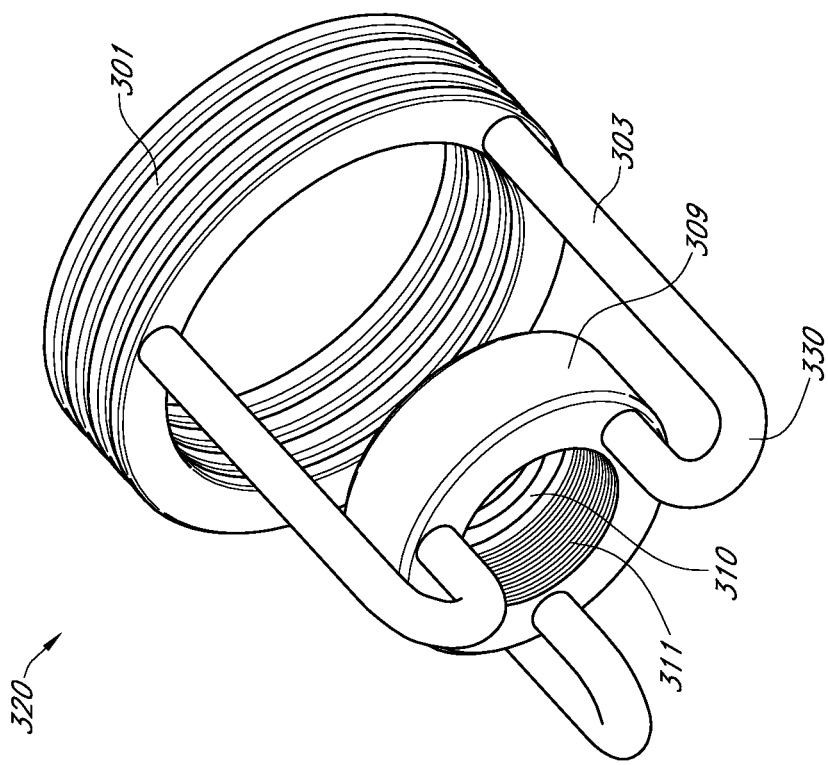
FIG. 4A is a perspective view of the robotic grip assembly of the plug unit of FIG. 2.

The robotic grip assembly 320 of the plug unit is illustrated in more detail in FIG. 4a, and comprises grip ring 301, hub 309 which is of smaller diameter than grip ring 301, and three or more stiff but flexible, hook-shaped rods 303 each connected at one end to the grip ring and at the other, hooked end to a forward end of hub 309. The curved portions 330 of the rods 303 permit the grip ring 301 to tilt, rotate, and offset by limited amounts about the mating axis of the plug unit. This freedom of movement helps to accommodate the rather clumsy motion of the robotic manipulators used to mate and demate the connectors. The inner diameter of the grip ring 301 is sufficient to simultaneously accommodate passing through of a cable secured to fitting 308 and the entry of a robotic manipulator grip.

As illustrated in FIG. 4A, ring-shaped hub 309 has a through bore with internal threads 311 configured for threaded engagement with external threads 312 on tubular slide 302, as seen in FIG. 7, and an internal shoulder 310. Grip ring 301 is configured for engagement by a robotic manipulator of a remotely operated vehicle (not illustrated).

Figure 4B:
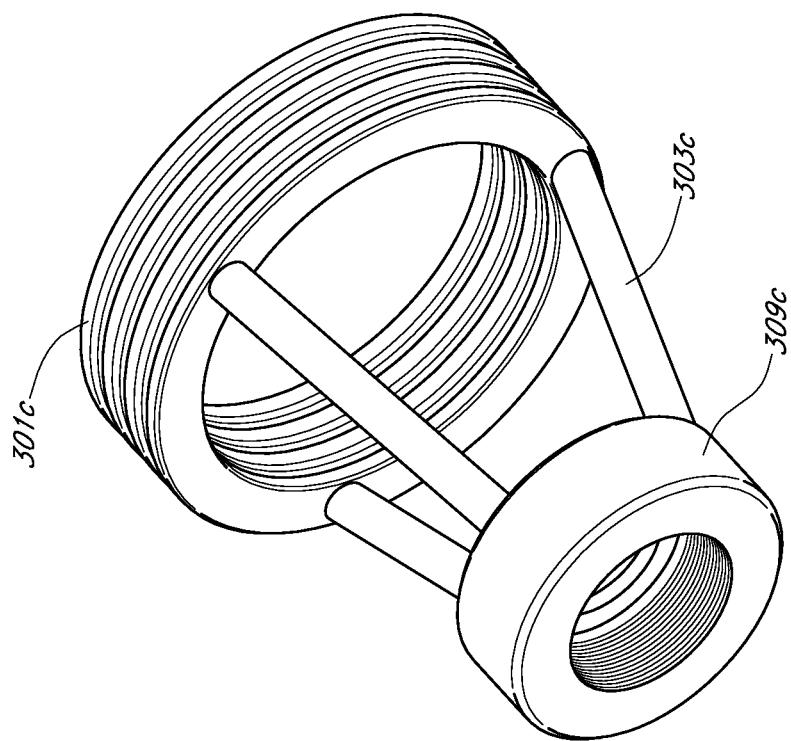
FIG. 4B is a perspective view similar to FIG. 4A illustrating a modified grip assembly.

The importance of the curved portions 330 of rods 303 can be appreciated by comparison with an alternative grip assembly as shown in FIG. 4b, where the connecting rods 303c between the grip ring 301c and the hub 309c are straight. Grip ring 301c of FIG. 4B is much more resistant to axial tilt and/or axial offset than the grip ring 301 of FIG. 4A, where the curved portions 330 permit such tilts and offsets. Certain tilt or offset motions of the grip ring 301c of FIG. 4b with respect to hub 309c require compression or stretch of the 303c rods, making the 301c motions much stiffer than motions of the corresponding grip ring 301 of FIG. 4A.

Figure 12:
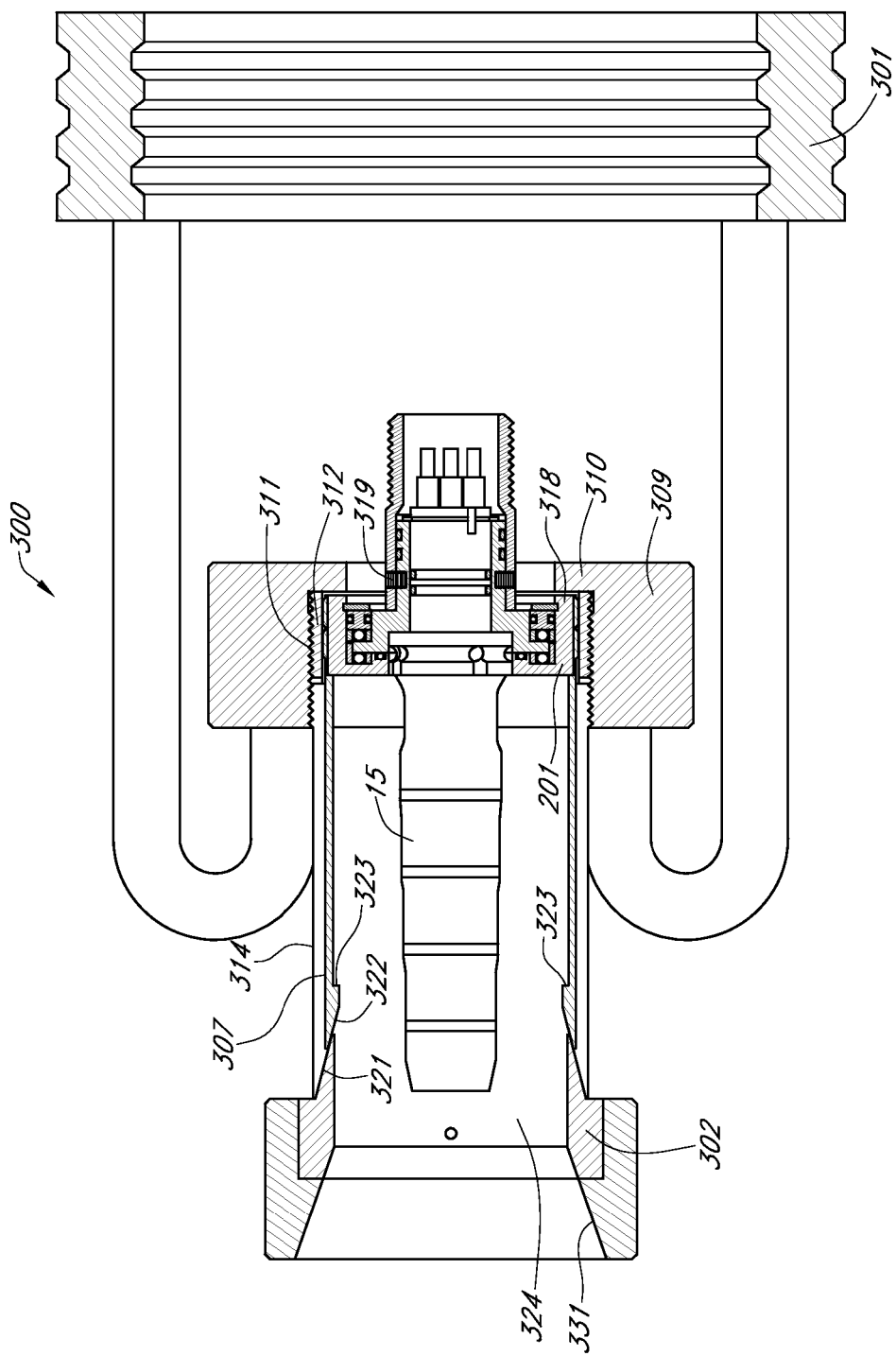
FIG. 12 is a side elevation view of the flying lead plug unit with the exterior elements shown in axial cross-section.

Grip assembly 320 is installed on the rear end of slide 302 by engaging threads 311 of hub 309 with outer threads 312 on the slide. Once the grip assembly is fully installed on the slide, the shoulder 310 of the grip assembly limits forward movement of the slide and grip assembly relative to the inner portion or shell part 201 to the point where shoulder 310 abuts the rear face 318 of the front shell or shell part 201. FIGS. 6 and 12 illustrates the plug unit with the slide 312 at its extreme forward position relative to front shell 201, at which point shoulder 310 of the grip ring assembly 320 is butted against face 318 of the front shell. The exterior parts of the plug unit are shown in axial cross-section in FIG. 12. In this position, ramps 322 of latch fingers 307 rest against opposing ramps 321 of slots 314 in slide 302, while shoulders 323 of latch fingers 307 protrude inward into the diameter or bore 324 of slide 302.

When the tubular slide is fully assembled with the remainder of the plug shell, as in FIGS. 7 and 12, the rotational orientation of slide 302 is substantially fixed with respect to front shell 201 by latch fingers 307 which are captured in slots 314. Relative back and forth axial movement between the slide and front shell part 201 is limited on the forward extreme by grip assembly shoulder 310 engaging front shell face 318, and on the rearward extreme by slide shoulder 316 butting against face 317. Plug bumper 305 can be installed onto slide 302 at any point in the assembly procedure, and secured in place by screws 333.

As best illustrated in FIG. 7, plug contact module 2 includes four contacts 11,12,13,14 of progressively increasing diameter in a direction away from the open front end of the tubular slide 302 of the plug shell. The contacts are integrally molded with rigid, non-electrically-conductive material into a monolithic unit having a forward-projecting, generally cylindrical pin 15 with a tapered tip 20, and an outer surface shaped into four consecutive diameter steps, each of the four steps being larger than its predecessor. Contact bands 11,12, 13,14 coincide with the respective steps, as illustrated in FIGS. 6 and 7. Plug pin 15 is hollow along at least the majority of its length from the forward tip 20, as described in co-pending application Ser. No. 12/943,301 referenced above.

Respective conductors (not visible in the drawing) extend from each ring-like contact to typical solder cup 22 on the contact module's cable-termination end. Contacts 11,12,13, 14 form integral units with the conductors and respective solder cups 22 within the molded contact assembly. Conductors or wires at the end of a flying lead cable are soldered to solder cups 22 while the cable is attached to fitting 308. Notches on the inner diameters of contacts 11,12,13,14 permit clearance between said contacts and conductor portions of neighboring contacts, said clearance being filled with dielectric material during the over-molding process. Prior to over-molding, the conductors are coated with a very thin, resilient, non-electrically-conductive material (not shown). In the post-mold shrinkage the over-molded material squeezes tightly around the thin resilient coating, thereby forming a hermetic seal to the conductors.

Bore 23 extends inward from the anterior end of plug contact module 2 to a point near the base of the plug contact module. Radial passages 24 ventilate bore 23 to groove 25 that runs around the circumference of base flange 26, as illustrated in FIG. 7.

Plug contact module 2 is axially held in place within rear shell 206 by retainer ring 5 and by surface 221 of plug contact module 2 acting against surface 222 of rear shell 206. Plug contact module 2 is rotationally held in place in the rear shell by alignment pin 6. O-rings 9 seal the interface between plug contact module 2 and rear shell 206.

Figure 8:
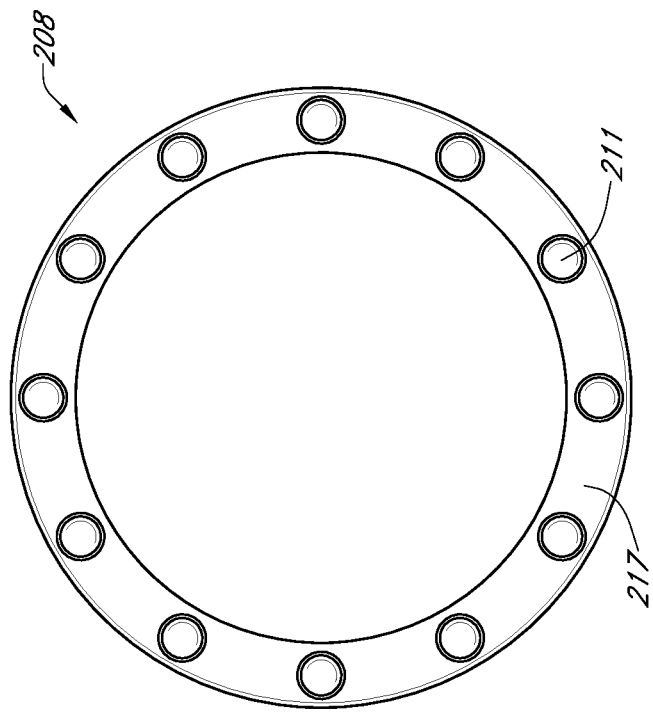
FIG. 8 is a front elevation view of a bearing assembly forming part of the rotary joint of FIG. 7.

Rear shell 206 is captured in front shell part 201 by a rotary joint comprising a pair of thrust bearing assemblies 207, 208. The rotary joint in plug unit 300 is similar to that described in co-pending application Ser. No. 13/009,681 referenced above, the contents of which are incorporated herein by reference. FIG. 8 illustrates bearing assembly 208 in front view, showing bearings 211 arranged radially in bearing race 217. FIG. 9 is a side view of bearing assembly 208 demonstrating bearings 211 protruding from either side of bearing race 217. Bearing assembly 207 is identical to bearing assembly 208 except for annular lip 220 of bearing assembly 207 (see FIG. 7), said annular lip serving to keep flange 219 axially centered within front shell part 201. Bearings 211 of bearing assembly 207 are axially captured between surface 223 of front shell part 201 and surface 224 of flange 219. Bearings 211 of bearing assembly 208 are axially captured between face 225 of flange 219 and face 226 of back-up ring 212. Back-up ring 212 is axially retained in place within front shell 201 by retainer ring 216.

As illustrated in FIG. 7, rear shell 206 is mechanically attached to a cable termination 308 via screws 319 that pass cable thrust, tension, bending, and torque from the cable to the rear shell, without applying significant forces directly to plug contact module 2. Therefore, it is seen that cable thrust and tension passes from the mechanical termination to flange 219 of rear shell 206 and from there to front shell 201 through bearings 211 acting against surface 223 of said front shell in the case of thrust, and against surface 227 of back-up ring 212 in the case of tension. Bending loads would be passed through the bearings 211 of both bearing assemblies 207, 208.

Careful study of plug assembly 200 as illustrated in FIG. 7 reveals that the sub-assembly consisting mainly of plug contact module 2 and rear shell 206 is free to rotate within front shell part 201 via rotational joint 550, even while supporting tensile, thrust, bending, and torque forces.

Seals 209, 213, and 214 cooperate with the surfaces against which they seat to form a closed chamber (not numbered) housing bearing races 207, 208, and the outer portion of flange 219. This chamber may be packed full of grease or gel (not shown) as part of the assembly process. Seals 209, 213, and 214 are free to slide laterally in their grooves thereby slightly expanding or contracting the chamber volume which they help define, such volumetric changes compensating for small variations of the enclosed grease or gel volume as would occur due to pressure and temperature changes.

In one embodiment of the device, bearings 211 are of a non-metallic material, such as ceramic, and furthermore bearing races 207, 208 are of a composite high-strength plastic material. These choices reduce the probability of material degradation due to corrosion, and reduce friction and galling that might occur if all components were metal.

FIG. 5 illustrates one embodiment of a receptacle contact module 120 which is enclosed within the outer receptacle shell comprising rear shell 405 and bumper 402. As described above, bumper 402 is secured to end flange 406 of shell 405 and extends forward from the flange. Alternatively, bumper 402 may be installed over a forward end portion of shell 405 or may be formed integrally with rear shell 405. Contact module 120 has a generally tubular anterior portion of varying radial cross-section, said tubular portion having a wall defined by inner surface 160 and outer surface 161, and includes four circuits each comprising a conductor rod 145 which extends from a typical solder cup 146 to the respective one of four contact seats 147,148,149,150, all of which are over-molded with a rigid, non-electrically-conductive material. This forms the wall of the contact module into a monolithic unit. Bore 152 of contact module 120 has steps of progressively decreasing diameter from the forward open end, with the steps having diameters that are slightly larger than corresponding steps 16,17,18,19 of plug pin 15. The steps house respective annular electrical contacts or contact bands 147,148,149,150 in respective annular contact seats. Four windows 157 through the side wall of contact module 120 permit free ventilation from the inside to the outside of the wall. Threaded socket 158 in the bottom of bore 152 accepts and retains center rod 136 of the receptacle unit. Radial passages 171,172,173,174 penetrate the wall of the tubular portion of the contact module as well as penetrating the contact seats which receive contacts 147,148,149,150. The radial passages permit free ventilation from the radially inward portion of the contact seats to the exterior of contact module 120. Between each pair of said electrical contacts, for instance 149,150, a seat houses a pair of elastomeric seals 166,167 which, in the connector's mated condition, cooperate with plug pin 15 to seal the successive contact pairs from each other.

Receptacle contact module 120 is housed within a canister formed by the receptacle outer shell or rear shell 405 and bumper 402. Snap ring 104 seats in groove 105 and retains end cap 103 in place. Rearward extension 106 of contact module 102 is seated in bore 107 at the rear end of shell 405. Contact module 120 is arrested in axial position by snap-ring 108 which is captured in groove 109. Retainer key 110 is captured in a bore formed by groove 117 in rearward extension 106 and a corresponding groove 140 in the rear part of the receptacle shell. O-rings 118 seated in grooves 119 seal the interface between the contact module 120 and the rear part of receptacle shell 405. Outer bladder 125 extends from the rear end of shell 405 to the forward open end of bumper 402, and has an integral sealing portion at its forward end, as described in more detail below. An elastomeric, generally tubular inner bladder 180 extends within the outer bladder from an annular shoulder 85 at a rear end portion of the receptacle module 120 up to a forward end portion of the module 120. Shoulder 116 in the posterior end of outer elastomeric bladder 125 is sealably retained in groove 121 of contact module 120.

Elastomeric inner receptacle bladder 180 is generally tubular in shape having four bulbous thin-walled sections 181 extending between heavier ribs 182. Ribs 182 are sealably stretched into respective grooves 183 formed into the exterior surface of contact module 120. The construction results in a series of small volumes 184,185,186,187 whose only ventilation is respectively through passages 171,172,173,174.

Center rod 136 extends from the rear end of the receptacle module through the tubular portion and up to the forward end of the receptacle unit 400. Center rod 136 has a large-diameter segment 189 which fits closely to inner diameter portion 153 of bore 152, serving to keep the bore and center rod axially aligned. Cutouts 188 on large-diameter segment 189 of center rod 136 permit axial ventilation across the large-diameter section. Windows 157 through the tubular wall of receptacle contact module 120 to the rear of inner bladder 180 allow free ventilation from bore 152 to the volume of oil 190 contained in outer bladder 125. The windows are large enough to permit the outer bladder to flex inward into bore 152 to compensate for volumetric changes.

Outer bladder 125 is ventilated to the connector's outside environment through radially-spaced passages 191 in receptacle shell 102, the passages leading to undercut portion 192 of said shell. Rigid cup-shaped guard 193 extends axially forward of said passages and serves to sealably retain shoulder 116 of outer bladder 125 into groove 121 of contact module 120. Guard 193 serves also to protect outer bladder 125 from damage due to foreign objects that might be introduced through passages 191.

A relatively heavy-walled segment 122 of the anterior portion of outer bladder 125 is held in axial position by shoulder 123 of contact module 120 acting against shoulder 124 of end cap 103. Notches 126 in shoulder 124 against which heavy-walled outer bladder segment 122 is pressed serve both to arrest rotation of outer bladder 125, and to provide fluid passage from the interior chamber of contact module 120 to the outermost portion of contact module 120 when the plug 1 and receptacle 100 portions of the connector are mated.

The extreme anterior end of outer bladder 125 terminates in heavy-walled dual elastomeric seals 129,130 which may be integrally molded features of the outer bladder and are defined as individual seals by v-groove 131. Corresponding dual end seals 132,133 secured in an annular groove or seat 135 in the forward end of center rod 136 may also be molded as a single unit and defined as individual seals by v-groove 134. Seals 132,133 act in cooperation with the opposing sealing surfaces of dual seals 129,130 to close the chamber formed by contact module 120, outer bladder 125 and center rod 136.

In the unmated condition of FIG. 5, end seals 129,130 are held tightly against corresponding end seals 132,133 by embedded garter springs 137,138 respectively. The seal-to-seal pressure therefore depends more upon the inwardly directed force provided by garter springs 137,138 than it does upon the stretch, if any, of end seals 129,130. This is major improvement over oil-filled connector receptacles that depend solely upon elastomeric stretch to accomplish the end seal. The garter springs also render the reliability of the sealed receptacle much less vulnerable to prior-art problems of seal elastic-memory loss Space 139 behind the inner surface of end cap 103 is ventilated to the outside environment by an inward radial extension 140 of space 139 between the inner surface of end cap 103 and the anterior end of end seal 130, said inward extension being in communication with annular opening 143 formed between end cap 103 and end 144 of center rod 136. End seals 129,130 move radially outward into space 139 during mating to sealably accommodate plug pin 15. Environmental material (water, in the case of underwater operation) displaced by the outward radial movement of end seals 129,130 is ventilated through radial extension 140 of space 139 and annular opening 143.

The only difference between the receptacle unit 400 and the receptacle units described in co-pending application Ser. Nos. 12/943,301 and 13/009,681 referenced above is the modified exterior shell 405 and the addition of forward end bumper 405. All other parts of the receptacle unit are identical to those described in the referenced co-pending applications.

FIGS. 2, 3 and 6 illustrate the plug and receptacle units in the unmated condition, with FIG. 6 illustrating the units aligned along a mating axis and facing one another prior to moving into mating engagement. However, the units need not be precisely aligned during mating, as discussed in more detail below. FIG. 12 illustrates the plug unit in the same position as FIG. 6, with the parts in cross-section. In one example, receptacle 400 is fixed over an opening in the wall of a structure such as a junction box located underwater or in another hostile environment. Plug 300 is attached by a generic fitting 308 to the end of an extended cable or "flying lead" cable. Fitting 308 is a generically displayed adaptor that permits the sealable, rigid connection of the cable to the plug rear shell 206. The seal may be accomplished by elastomeric seals and the mechanical attachment by screws 319. The cable may be a simple subsea insulated electrical cable, or it could be an oil-filled hose with electrical conductors inside. In either case, the robotic manipulator of a manned or remotely operated subsea vehicle would have the grip ring 301 in its grasp during mating, while the cable passes out through the grip ring.

As noted above, plug unit 300 is poised to begin mating with receptacle 400 in the position of FIGS. 6 and 12. It is being urged forward by force applied in the mating direction on grip ring assembly 320, so that shoulder 310 of hub 309 engages surface 318 of plug front shell part 201. As the forward motion of plug unit 300 continues, receptacle bumper 401 enters conical entry 331 of plug bumper 305. At this point, the mating axes of plug 300 and receptacle 400 may not be coincident or aligned, due to clumsy robotic operation. The freedom of movement of grip ring 301 provided by flexible rods 303 requires the manipulator only to have a sufficient component of force along the mating axis to move the mating connector units together, while at the same time, the off-axis forces applied by the manipulator simply distort rods 303 that connect grip ring 301 to the hub. Thus, the flexibility of rods 303 allows grip ring 301 to transmit force in the mating direction even if the grip ring is tilted, offset, or misaligned in any direction with respect to the mating central axis of receptacle unit 400. The conical opening 331 at the forward end of the plug unit helps to align the mating axis of the plug unit with that of receptacle unit 400 as mating proceeds.

Figure 13:
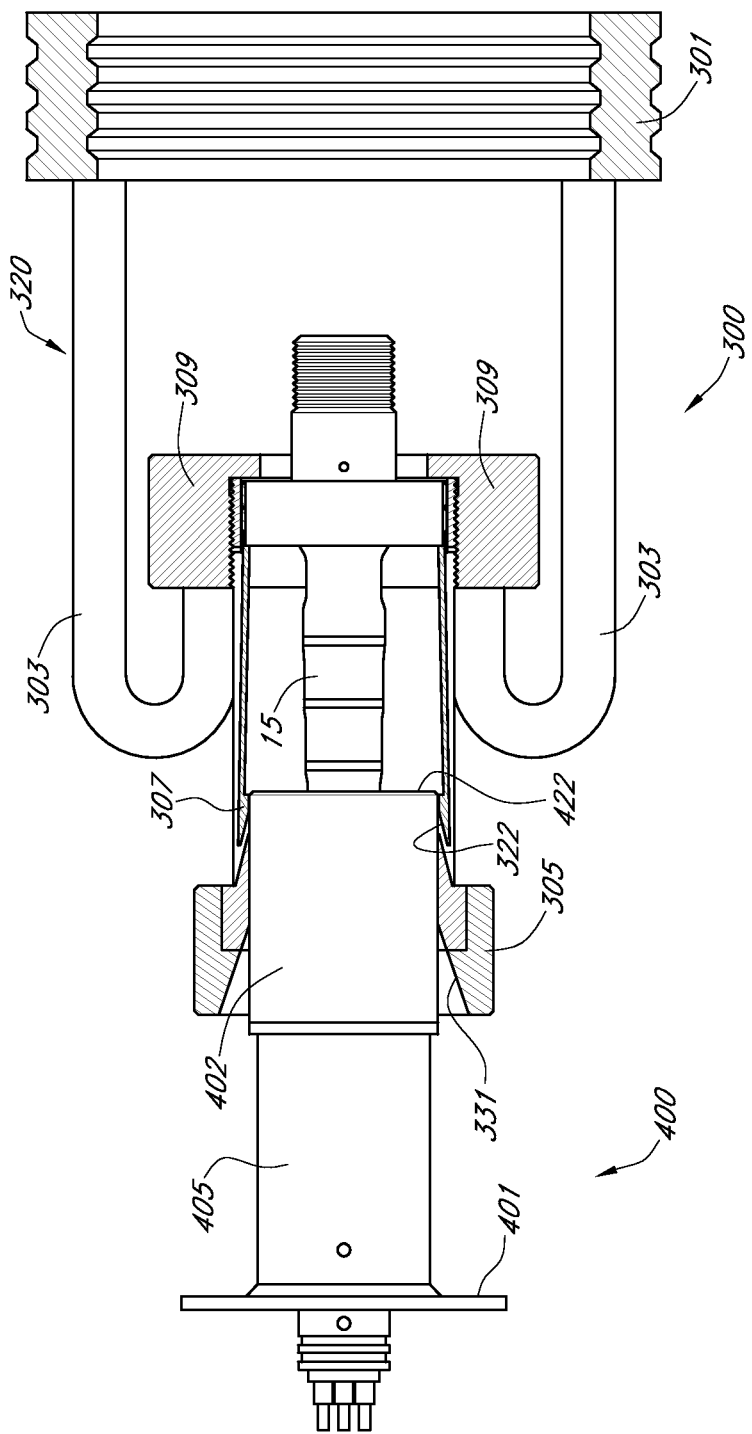
FIG. 13 is a side elevation view of the plug and receptacle units aligned and in a partially mated condition.

During the mating process described above, tapered end 20 of plug pin 15 enters annular opening 143 in the mating face of the receptacle, eventually pressing against the interface between receptacle end seals 130 and 133. FIG. 13 illustrates a position in which the tapered end 20 has just entered the receptacle unit. As the mating process continues, ramps 322 of latch fingers 307 encounter the leading edge 422 of receptacle bumper 402, as shown in FIG. 13, and start to ride up over the bumper, springing the latch fingers radially outward. As the mating completes, the ramps 322 proceed past receptacle bumper 401 and spring radially inward behind shoulder 403 of receptacle shell 405, with the shoulders 323 engaging the shoulder 403 as in FIG. 14. At this point, the plug and receptacle units are fully mated.

Figure 14:
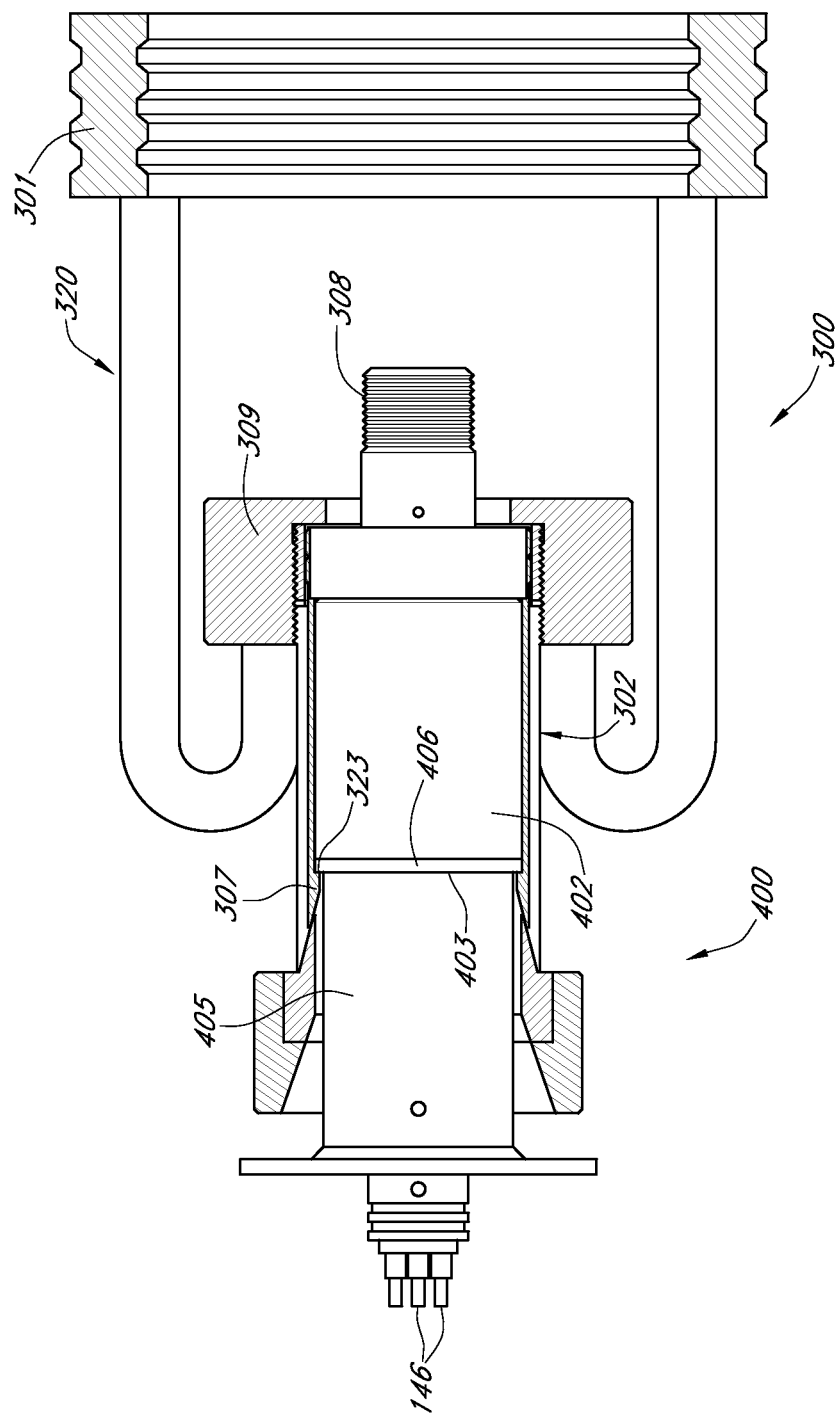
FIG. 14 is a side elevation view similar to FIG. 13 but with the plug and receptacle units fully mated.

While the exterior parts of the plug and receptacle units move into mating engagement between the positions in FIGS. 13 and 14, the plug pin tapered end 20 simultaneously passes sealably into and through the interface between the outer and inner end seals at the forward end of the receptacle module 120, the end seals wiping clean the inside 30 and outside 31 surfaces of plug pin 15 as the pin passes through them, while the receptacle center rod 136 passes into the pin bore 23.

Receptacle end seals 129 and 132 provide a second wiping and sealing of the pin surfaces.

Receptacle center rod 136 cooperates with plug shell 3 and receptacle shell 102 to further axially align the mating components. As receptacle center rod 136 sealably enters bore 23 of plug pin 2 it forces environmental material, e.g. water in the case of underwater mating, out through passages 24 in base flange 26 of plug contact module 15, the material entering circumferential groove 25 in the flange, and eventually exiting through vent holes (not illustrated). The mating sequence continues until the annular plug contacts 11, 12, 13 and 14 on the outer surface of pin 15 engage with the corresponding diameter contact seats 147,148,149,150 in the receptacle module in the fully mated position of FIG. 14, as described in detail in co-pending application Ser. No. 12/943,301 referenced above.

When the plug and receptacle units are fully mated, each plug/receptacle set of engaged contacts is separated from each other set by at least two elastomeric barriers, and each set is also separated from the external environment by at least two elastomeric barriers. Each contact set is enclosed in its own sealed oil volume 184,185,186,187 defined by the bulbous elastomeric wall segments 181 of inner receptacle bladder 180, and by seals such as 166,167 and 203 which seal to plug pin 15. These individual sealed volumes are closed off as plug pin 15 nears the fully-mated position. Therefore, they need only to compensate the oil volume contained within them for environmental variations such as temperature and pressure.

As learned from the co-pending application Ser. No. 12/943,301 referenced above, it is not necessary to keep plug 300 and receptacle 400 rotationally aligned to maintain the integrity of the mated electrical circuits. Because rear shell 206 of plug 200 is free to rotate within plug front shell via the rotary joint 550, the plug can be maneuvered robotically without applying significant torque to the attached cable, thereby reducing or eliminating the problem of twisting the flying lead. Rotation of the rear shell and plug contact module relative to the front shell during mating as a result of such maneuvering does not affect the ability of the plug contacts to be properly mated with the corresponding receptacle contacts, since no rotational alignment is required for contact to occur.

Figure 15:
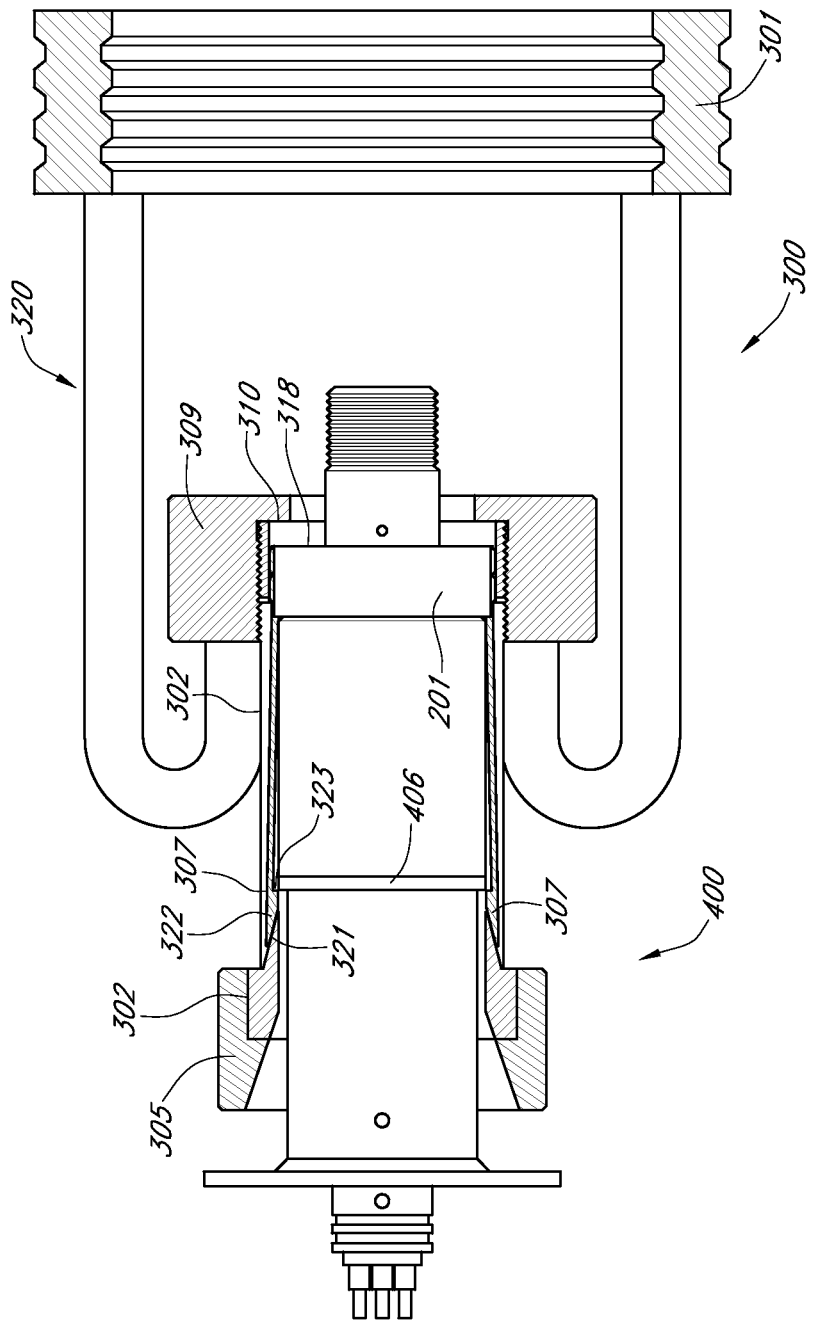
FIG. 15 is a side elevation view similar to FIGS. 13 and 14 but illustrating the condition where a de-mating pull has been applied to the grip ring of the plug unit.

As noted above, FIG. 14 illustrates the plug and receptacle units in mating engagement, connecting conductors in a cable connected to fitting 308 to connectors coupled with solder pots 146 at the rear end of receptacle unit 400. The arrangement is such that, if a tensile load is applied to fitting 308 in this position, for example if a cable attached to fitting 308 is pulled, the plug unit does not become disconnected from the receptacle unit. Such a tensile load would simply cause latch finger shoulders 323 to press more tightly against surface 403 of shoulder 406 of the receptacle shell 405. On the other hand, a pull on grip ring 301 results in movement of slide 302 which is attached to hub 309 in the de-mating direction. FIG. 15 illustrates plug and receptacle units 300, 400 in the condition where a de-mating pull has been applied to grip ring 301 by a robotic manipulator. Such a pull causes grip ring assembly 320, slide 302, and plug bumper 305 to move relative to front shell part 201 in an unlatching direction away from the receptacle unit. This movement causes ramp 321 of slide 302 to move against ramps 322 of latch fingers 307 secured to front shall part 201, urging the latch fingers to move radially outward and away from shoulder 406, as indicated in FIG. 15. This movement releases the latch finger shoulders 323 from shoulder 406, simultaneously freeing plug unit 300 to disconnect from receptacle unit 400.

In the connector described above, the receptacle contacts are housed in a pressure-balanced chamber filled with non-conductive oil. During the mating/de-mating sequence the plug's probe enters the receptacle's chamber through an opening that remains sealed before, during, and after mating and de-mating. The plug and receptacle's relative angular position around the mating/de-mating axis is unimportant, and need not be controlled. Furthermore, the plug and receptacle electrical contacts of the mated connector can rotate about the mating axis without degradation of the device or of the connected circuits' quality, which allows the connector to be adapted as described above to incorporate a rotating joint in order to compensate for twisting of the flying lead cable during mating. In the above embodiment, the plug and receptacle units are contained in housings that, once joined, permit their free angular rotation while still supporting axial thrust and/or tensile and bending loads.

The construction described above provides a robotically actuated multi-circuit electrical connector that requires no rotational keying during mating, avoiding or reducing the difficulty in connecting the mating parts of a connector robotically, for example when mated underwater or in other harsh environments. In one embodiment, the connector is ROV mateable for underwater operations, but may be designed with a suitable robotic engagement device for other types of robotic actuation in other harsh environments. Due to the inclusion of a rotary joint in the connector, rotating the connector on the cable's free end, as happens during robotic vehicle maneuvering, does not result in twisting of the jumper cable. The cable grip assembly described above permits the cable exit to be oriented along the mating axis of the flying-lead plug unit, which is more convenient than prior art arrangements where the cable exit is orthogonal to the mating axis. The grip assembly is also designed to compensate relatively easily for axial offset and tilt of the mating connector units.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

I claim:
1. A robotically mateable connector, comprising:
   first and second releasably mateable connector units movable along a mating/de-mating axis between mated and unmated conditions, the first and second connector units having respective first and second contact modules, each contact module having at least one contact configured for mating engagement with a corresponding contact of the other connector unit when the units are fully mated;
   the first connector unit having a front shell, a rear shell, a rotary joint between the front and rear shells configured to permit relative rotation between the shells about the mating/de-mating axis, and a robotic manipulator grip assembly associated with the front shell and adapted for engagement by a robotic manipulator;

the first contact module being secured to the rear shell, the rear shell having a cable attachment fitting; and the first and second connector units being configured for robotic mating and the first and second contact modules being relatively rotatable about the mating/de-mating axis in the mated condition of the units while maintaining mated engagement between corresponding contacts of the first and second contact modules.

2. The connector of claim 1, wherein the cable attachment fitting is aligned with the mating/demating axis and the grip assembly has a through bore aligned with the fitting whereby an attached cable can exit along the mating/demating axis of the connector.

3. The connector of claim 1, wherein each contact module has a plurality of contacts configured for keyless mating engagement with corresponding contacts of the other connector unit when the units are fully mated, the engagement being independent of relative rotational alignment of the contact modules about the mating/de-mating axis, wherein the first and second connector units are robotically mateable independent of relative rotational alignment between the units, and the first and second contact modules are relatively rotatable about the mating/de-mating axis in the mated condition of the units while maintaining mated engagement between corresponding contacts of the first and second contact modules.

4. The connector of claim 3, wherein at least one of the connector units has a fluid-filled contact chamber in which the corresponding contact module is located and a sealing mechanism at the forward end of the chamber which seals the chamber when the units are unmated and forms a seal with the other connector unit both during and after mating of the units.

5. The connector of claim 4, wherein one of the connector units comprises a plug unit with a contact module having a pin with an outer surface carrying a plurality of axially spaced, annular contacts of gradually decreasing diameter towards a forward end of the pin, and the other connector unit comprises a receptacle unit releasably mateable with the plug unit and including said fluid-filled contact chamber, the contact module of said receptacle unit being located in said contact chamber and having a bore configured for engagement over the pin, the bore having a plurality of axially spaced, annular contacts of gradually increasing diameter towards a forward end of the receptacle unit, the contacts being configured for mating engagement with corresponding annular contacts of the plug contact module when the plug and receptacle units are mated, the sealing mechanism which seals the chamber when the units are unmated being configured to form a seal with the plug module pin both during and after mating of the units.

6. The connector of claim 5, wherein the plug unit comprises the first connector unit.

7. The connector of claim 5, wherein the plug pin is hollow and has a bore extending inwardly from a forward end of the pin, and the sealing mechanism comprises an annular end seal at the forward end of the chamber and a center rod extending through the chamber which has a forward end portion in sealing engagement with the annular end seal in the unmated condition of the units, the center rod being configured for extending into the bore of the hollow plug pin in the mated condition of the units.

8. The connector of claim 1, wherein the robotic manipulator grip assembly comprises an annular grip ring configured for engagement with a robotic manipulator, an annular hub spaced forward from the grip ring and configured for engagement with the front shell of the first connector unit, and a plurality of rods connecting the hub and grip ring.

9. The connector of claim 8, wherein the grip ring is of larger diameter than the annular hub and the rods each extend from the grip ring over the annular hub and have curved, hook-shaped ends secured to a front end of the hub, the rods being flexible and adapted to distort and permit tilting and rotational freedom of movement of the annular hub about the mating axis of the connector units during mating.

10. The connector of claim 9, wherein the front shell of the first connector unit has a front bumper having a conical opening configured for engagement with a front end of the second connector unit and for guiding the units into axial alignment along the mating axis during robotic mating.

11. The connector of claim 1, wherein the first connector unit comprises a flying-lead plug unit and the second connector unit comprises a receptacle unit.

12. The connector of claim 1, wherein the front shell comprises an inner portion rotatably coupled to the rear shell, a tubular slide extending forward from the inner portion over the first contact module, and a coupling device between the inner portion and tubular slide which resists relative rotation between the inner portion and tubular slide.

13. The connector of claim 12, wherein the tubular slide has a rear portion which surrounds the inner portion of the front shell and is connected to the robotic manipulator grip assembly.

14. The connector of claim 13, wherein the grip assembly has a ring-shaped hub with internal threads surrounding a rear end portion of the front shell, and the rear end portion of the tubular slide has outer threads in releasable threaded engagement with the internal threads of the ring-shaped hub.

15. The connector of claim 14, wherein the coupling device and ring-shaped hub are configured to permit a predetermined amount of relative axial sliding movement between the tubular slide and inner portion of the front shell.

16. The connector of claim 15, wherein the tubular slide has a pair of axially extending slots and the coupling device comprises a pair of latch fingers extending from the inner portion into the slots, the latch fingers being configured for releasable latching engagement with the second connector unit in the mating condition of the units, and the tubular slide being configured to urge the latch fingers out of latching engagement with the second connector unit when pulled by the grip assembly in an unlatching direction away from the second connector unit, the inner portion of the front shell having a stop which engages the tubular slide to prevent further movement of the tubular slide in the unlatching direction when the fingers are in an unlatched position.

17. The connector of claim 16, wherein the second connector unit has a latching shoulder and the latch fingers each have a rearwardly facing indent configured for releasable latching engagement over the latching shoulder in the mated condition of the units.

18. The connector of claim 17, wherein the forward end of each slot and the opposing forward end of the respective latch finger have opposing ramp surfaces, whereby rearward movement of the tubular slide in the mated condition of the units urges each latch finger outwardly away from the latching shoulder to permit de-mating of the first and second connector units.

19. A robotically mateable connector, comprising:
a flying-lead plug unit having a mating axis;
a receptacle unit adapted for releasable mating engagement with the plug unit along the mating axis;
the plug unit having a robotic manipulator grip assembly adapted for engagement by a robotic manipulator, a tubular housing associated with the grip assembly, the housing having a forward end and a rear end, the housing comprising a rear shell which contains a plug module having at least one plug contact and a cable attachment fitting, a front shell which extends over the plug module, and a rotary joint between the front and rear shell; and the receptacle unit comprising a receptacle module having a bore containing at least one receptacle contact for engagement with said at least one plug contact when the plug and receptacle units are fully mated.

20. The connector of claim 19, wherein the plug module has an outer surface carrying a plurality of axially spaced, annular contacts of gradually decreasing diameter towards a forward end of the module, and receptacle module bore contains spaced annular contact seats of gradually increasing diameter adapted for engagement with the plug contacts when the plug and receptacle units are fully mated, whereby the contact modules are relatively rotatable about the mating axis in the mated condition of the units while maintaining mating engagement between corresponding contacts of the plug and receptacle modules.

21. The connector of claim 19, wherein the cable attachment fitting is aligned with the mating axis and the grip assembly has a through bore aligned with the fitting whereby an attached cable can exit along the mating/demating axis of the connector.

22. The connector of claim 21, wherein the robotic manipulator grip assembly comprises an annular grip ring configured for engagement with a robotic manipulator, an annular hub spaced forward from the grip ring and configured for engagement with the front shell of the plug unit, and a plurality of rods connecting the hub and grip ring.

23. The connector of claim 22, wherein the grip ring is of larger diameter than the annular hub and the rods each extend from the grip ring over the annular hub and have curved, hook-shaped ends secured to a front end of the hub, the rods being flexible and adapted to distort and permit tilting and rotational freedom of movement of the annular hub to compensate for non-alignment of the mating axes of the plug and receptacle units on engagement of the forward end of the receptacle unit in the forward shell of the plug unit.

24. The connector of claim 19, wherein the front shell comprises an inner portion rotatably connected to the rear shell, a tubular slide extending over the plug contact module, the tubular slide having a rear end portion releasably connected to the grip assembly, and a coupling device between the inner portion and tubular slide which resists relative rotation between the inner portion and tubular slide.

25. The connector of claim 24, wherein the coupling device comprises at least one slot in the tubular slide and at least one latch finger extending forward from the inner portion into the slot.

26. The connector of claim 25, wherein the at least one latch finger further comprises a latching formation and the receptacle unit has an outer latching shoulder configured for releasable latching engagement with the latching formation in the mated condition of the units.

27. The connector of claim 25, wherein the coupling device comprises at least two spaced longitudinally extending slots in the tubular slide and at least two latch fingers extending from the inner portion and engaging in the respective slots.

* * * * *